(12) United States Patent
Buch et al.

(10) Patent No.: US 12,007,839 B2
(45) Date of Patent: *Jun. 11, 2024

(54) INTERLEAVED CODEWORD TRANSMISSION FOR A MEMORY DEVICE

(71) Applicant: Micron Technology, Inc., Boise, ID (US)

(72) Inventors: Steffen Buch, Munich (DE); Thomas Hein, Munich (DE)

(73) Assignee: Micron Technology, Inc., Boise, ID (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/732,289

(22) Filed: Apr. 28, 2022

(65) Prior Publication Data

US 2022/0365845 A1 Nov. 17, 2022

Related U.S. Application Data

(60) Provisional application No. 63/188,233, filed on May 13, 2021.

(51) Int. Cl.
*H03M 13/27* (2006.01)
*G06F 11/07* (2006.01)
*G06F 11/10* (2006.01)
*G06F 13/16* (2006.01)
*G06F 13/28* (2006.01)
*H03M 13/25* (2006.01)
*H04L 1/00* (2006.01)
*H04L 27/34* (2006.01)

(52) U.S. Cl.
CPC ........ *G06F 11/1068* (2013.01); *G06F 11/076* (2013.01); *G06F 11/0772* (2013.01); *G06F 11/0787* (2013.01)

(58) Field of Classification Search
CPC ............... G06F 11/1068; G06F 11/076; G06F 11/0772; G06F 11/0787
See application file for complete search history.

(56) References Cited

U.S. PATENT DOCUMENTS

| 8,381,046 B2 | 2/2013 | Yang |
| 10,256,840 B2 | 4/2019 | Alam et al. |
| 10,871,910 B1 | 12/2020 | Alrod et al. |

(Continued)

OTHER PUBLICATIONS

"International Search Report and Written Opinion of the International Searching Authority," issued in connection with Int'l Appl. No. PCT/US2022/072107 dated Aug. 12, 2022 (13 pages).

*Primary Examiner* — Guy J Lamarre
(74) *Attorney, Agent, or Firm* — Holland & Hart LLP

(57) ABSTRACT

Methods, systems, and devices for memory operations are described. A first code for detecting one or more errors in a first set of bits of data and a second code for detecting one or more errors in a second set of bits of data may be generated. The first set of bits and the second set of bits may be transmitted over a channel between a memory device and a host device in an interleaved pattern. The first code and the second code may also be transmitted over the channel. The first set of bits and the second set of bits may be deinterleaved by the receiving device. The first set of bits and the second set of bits may also be processed by the receiving device using the first code and the second code.

32 Claims, 11 Drawing Sheets

(56) References Cited

U.S. PATENT DOCUMENTS

| | | | |
|---|---|---|---|
| 11,404,136 B2* | 8/2022 | Amato | G11C 29/52 |
| 2004/0064782 A1 | 4/2004 | Lerner et al. | |
| 2017/0097869 A1 | 4/2017 | Sharon et al. | |
| 2017/0214415 A1* | 7/2017 | Kokubun | H03M 13/27 |
| 2019/0051359 A1* | 2/2019 | Yoo | G11C 16/10 |

* cited by examiner

INTERLEAVED CODEWORD TRANSMISSION FOR A MEMORY DEVICE

CROSS REFERENCE

The present application for patent claims the benefit of U.S. Patent Application No. 63/188,233 by Buch et al., entitled "INTERLEAVED CODEWORD TRANSMISSION FOR A MEMORY DEVICE," filed May 13, 2021, assigned to the assignee hereof, and is expressly incorporated by reference in its entirety herein.

FIELD OF TECHNOLOGY

The following relates generally to one or more systems for memory, including and more specifically to interleaved codeword transmission for a memory device.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

Figure 1:
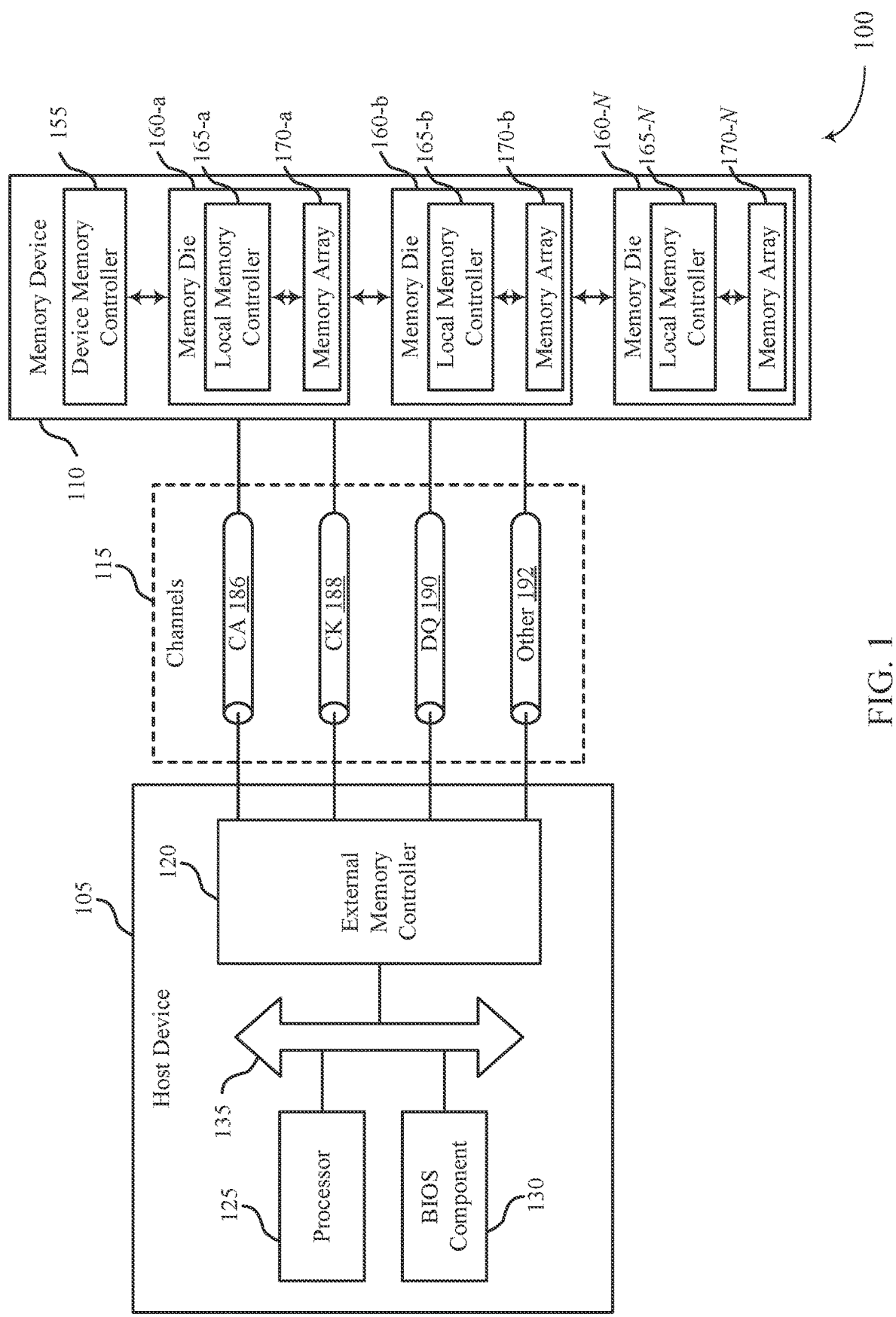
FIG. 1 illustrates an example of a system that supports interleaved codeword transmission for a memory device in accordance with examples as disclosed herein.

Error protection techniques may be used to detect (and, in some examples, correct) errors in transmissions between a memory device and a host device. In some examples, to protect a data transmission from transmission errors, an error protection technique may generate multiple error protection codes for one or more subsets of the data—a subset of data may be referred to as a codeword or the subset of data and the corresponding error protection code, together, may be referred to as a codeword. In some examples, if multiple codewords are generated for a set of data, the codewords may be communicated between a memory device and host device in a consecutive manner. For example, data bits of a first codeword may be communicated during a first set of consecutive unit intervals using a set of data lines and data bits of a second codeword may be communicated during a second set of consecutive unit intervals using the set of data lines.

Communicating codewords in a consecutive manner may result in localized (e.g., short-term, targeted, or both) interference that affects one of multiple codewords used to communicate a set of data between a memory device and host device. Accordingly, in some examples, localized interference may cause a multi-bit error to occur in one of the codewords but not the others. In such examples, the ability of an error protection technique to detect a multi-bit error in the codeword will be limited by the probability that the error protection technique will detect a multi-bit error in a single codeword. Also, if the error protection technique fails to detect a multi-bit error in a first codeword (e.g., caused by localized interference) and no errors are detected in the other codewords, the error protection technique may fail to detect any errors in the communicated set of data.

To increase the probability that a multi-bit error will be detected in at least one of the codewords used to communicate a set of data over a data bus, techniques for increasing the likelihood that localized interference will create multi-bit errors in multiple of the codewords may be established. In some examples, data is retrieved from a memory array based at least in part on a read command received from a host device. A first code for detecting (and, in some examples, correcting) one or more errors in a first set of bits of the data and a second code for detecting (and, in some examples, correcting) one or more errors in a second set of bits of the data may be generated. The first set of bits and the second set of bits may be transmitted to the host device in an interleaved pattern across different unit intervals and data channels—e.g., an alternating pattern, a checkerboard pattern. The first code and the second code may also be transmitted to the host device—e.g., in an interleaved pattern. The first set of bits and the second set of bits may be respectively processed by the host device using the first code and the second code.

By interleaving the first set of bits of data and second set of bits of data, the likelihood that localized interference will cause errors in both the first set of bits and the second set of bits may be increased, and thus, the probability that the receiving device will detect a multi-bit error in at least one of the first set of bits or the second set of bits may be increased.

In some examples, data is identified by a host device for storage in a memory array of a memory device. A first code may be generated for a first set of bits of the data and a second code may be generated for a second set of bits of the data, where the codes may be used to detect (and, in some examples, correct) errors in the respective set of bits. A write command may be transmitted to the memory device along with the first set of bits and the second set of bits, which may be transmitted in an interleaved pattern—e.g., an alternating pattern, a checkerboard pattern. The first code and the second code may also be transmitted to the memory device—e.g., in an interleaved pattern. The first set of bits and second set of bits may be respectively processed by the memory device using the first code and the second code to identity whether there are one or more errors in the first set of bits or the second set of bits. If there are no errors detected in the first set of bits or the second set of bits, the first set of bits and the second set of bits may be written to the memory array.

By interleaving the first set of bits of data and second set of bits of data, the likelihood that localized interference will cause errors in both the first set of bits and the second set of bits may be increased, and thus, the probability that the memory device will detect a multi-bit error in at least one of the first set of bits or the second set of bits may be increased.

Features of the disclosure are initially described in the context of systems and dies. Features of the disclosure are also described in the context of systems and signal maps. These and other features of the disclosure are further illustrated by and described with reference to an apparatus diagram and flowcharts that relate to interleaved codeword transmission for a memory device.

FIG. 1 illustrates an example of a system 100 that supports interleaved codeword transmission for a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160a, memory die 160b, memory die 160N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal). The techniques described herein may be an example of link error control procedures (e.g., link ECC) applied to communications between the host device 105 and the memory device 110 over the channels 115.

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, a memory device 110 retrieves data from a memory array based at least in part on a read command received from a host device 105. Memory device 110 may generate a first code for detecting (and, in some examples, correcting) one or more errors in a first set of bits of the data and a second code for detecting (and, in some examples, correcting) one or more errors in a second set of bits of the data. The memory device 110 may transmit the first set of bits and the second set of bits to the host device 105 in an interleaved pattern—e.g., an alternating pattern, a checkerboard pattern. The memory device 110 may also transmit the first code and the second code to the host device 105—e.g., in an interleaved pattern. The host device 105 may process the first set of bits using the first code and the second set of bits using the second code.

In some examples, a host device 105 identifies data for storage in a memory array of a memory device 110. The host device 105 may generate a first code for a first set of bits of the data and a second code for a second set of bits of the data, where the codes may be used to detect (and, in some examples, correct) errors in the respective sets of bits. The host device 105 may transmit a write command to the memory device 110 along with the first set of bits and the second set of bits, which may be transmitted in an interleaved pattern—e.g., an alternating pattern, a checkerboard pattern. The host device 105 may also transmit the first code and the second code to the memory device—e.g., in an interleaved pattern. The memory device 110 may process the first set of bits using the first code and the second set of bits using the second code to identity whether there are one or more errors in the first set of bits or the second set of bits. If there are no errors detected in the first set of bits or the second set of bits, the memory device 110 may write the first set of bits and the second set of bits to the memory array.

Figure 2:
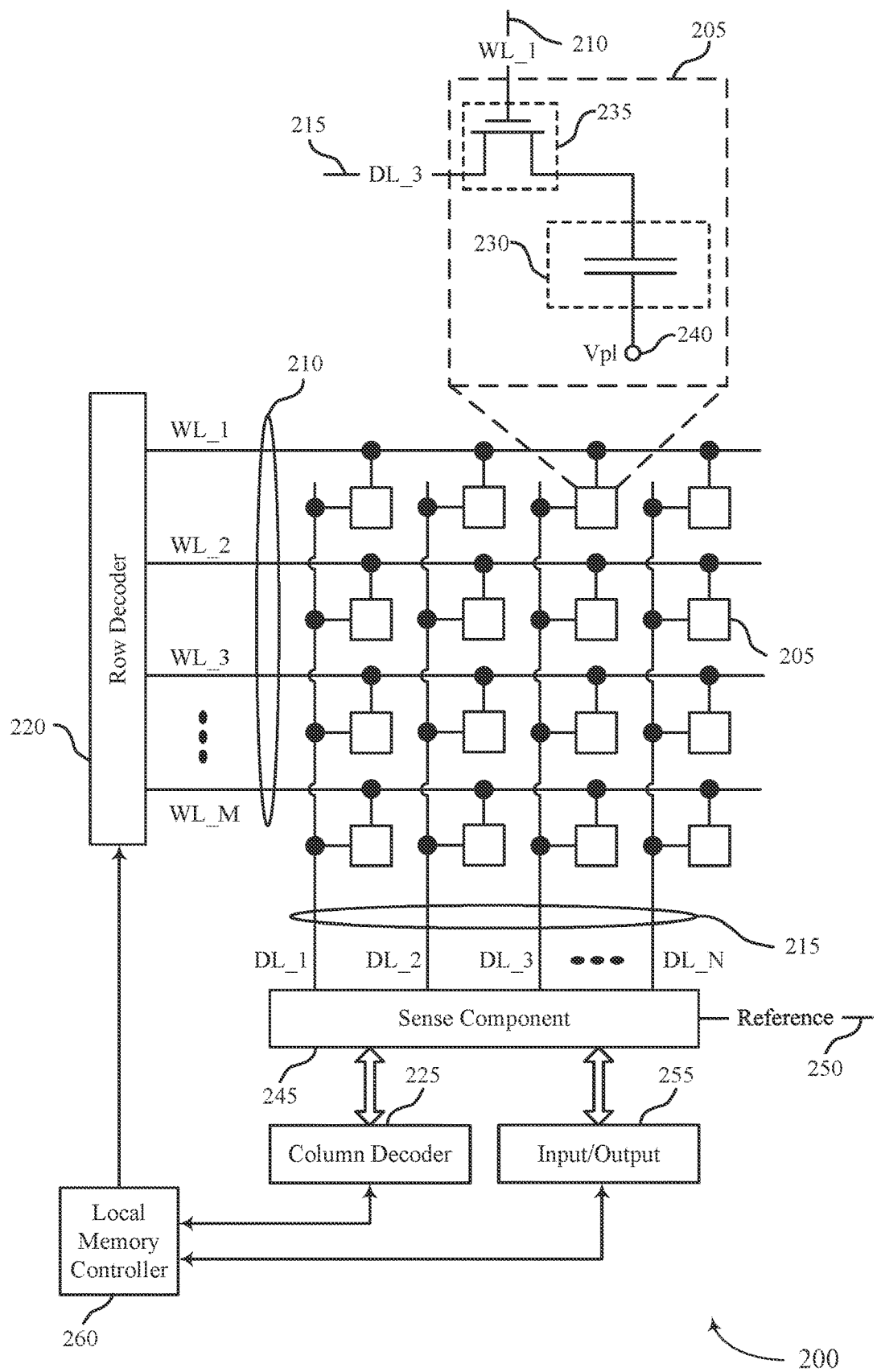
FIG. 2 illustrates an example of a memory die that supports interleaved codeword transmission for a memory device in accordance with examples as disclosed herein.

FIG. 2 illustrates an example of a memory die 200 that supports interleaved codeword transmission for a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 in response to the switching component 235 being deactivated, and the capacitor 230 may be coupled with digit line 215 in response to the switching component 235 being activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

Errors may occur during the transmission of data between a memory device (e.g., memory device 110 if FIG. 1) and a host device (e.g., host device 105 of FIG. 1). Possible sources of data corruption that can occur during transmission include coupling effects between neighboring DQ lines (e.g., cross-link interference); sub-eye weakness (e.g., a breakdown of an eye diagram between two levels of a multi-level eye diagram); decision feedback equalization effects; pre-emphasis effects; short burst errors; 4 phase clock asymmetry, clock jitter in one or more consecutive unit intervals (e.g., a clock cycle, a rising edge of a clock cycle, or a falling edge of a clock cycle), package faults (e.g., ball opens or shorts, wire bond cracks), or any combination thereof.

In some examples, different portions of a set of data may be communicated over a set of DQ lines in accordance with a rising and falling edge of a clock—the rising and falling edge of a clock may be referred to as beats, and the duration between the rising and falling edge of a clock may be referred to as a unit interval. Some sources of errors (which may also be referred to as interference or disturbances) that occur while communicating data over a set of data lines may affect portions of data transmitted during one or more beats (e.g., errors caused by clock jitter)—that is, such sources may affect bits transmitted over each data line during the one or more beats. Other sources of communication errors that occur while communicating data over a set of data lines may affect portions of data transmitted over one or more data lines (e.g., a ball open or short) across multiple beats, while data transmitted over the remaining data lines may be unaffected across the multiple beats.

Error protection techniques may be used to detect (and in some examples, correct) errors in data transmissions between a memory device and a host device. One error protection technique includes generating a cyclic redundancy check (CRC) code for a set of data that is transmitted with the set of data and can be used to determine whether there are one or more errors in the transmitted set of data. In some examples, a probability that a CRC-based error protection technique will detect multi-bit errors is based on the quantity of bits included in the CRC code, such that the probability of detecting a multi-bit error is given by $P(MBE_{CRC})=1-2^{-e}$.

Another error protection technique includes generating parity bits for a set of data based on a Hamming code (where different parity bits may protect different portions (e.g., overlapping portions) of the set of data). An error protection technique that uses Hamming codes may be used to detect (and, in some examples, correct) errors in received data. In some examples, a Hamming code can correct single-bit errors and detect double-bit errors one hundred percent of the time (which may be referred to as a SEC-DED code). The Hamming code may also be capable of detecting multi-bit errors with a probability that is based on the quantity of parity bits included in the Hamming code and the quantity of data bits, such that the probability of detecting a multi-bit error is given by $P(MBE_{ECC})=1-(d+e+1)*2^{-e}$. In some examples, to reach this probability, a phantom error detection logic may be implemented by a memory device, host device, or both.

In some examples, data may be communicated over a DQ bus in read or write bursts of data bits. In some examples, the data bits included in a burst are split across multiple CRC, ECC, or EDC code words. For example, the data bits may be included in two codewords, where each codeword may have 128 data bits and nine (9) parity bits. Portions of a codeword (e.g., eight bits of a codeword) may be communicated over the DQ bus on each edge of a clock (e.g., each beat of a clock). In some examples, the codewords are communicated over the DQ bus in a consecutive manner such that the first codeword is communicated over a first sixteen beats and the second codeword is communicated over a subsequent sixteen beats.

Communicating codewords in a consecutive manner may result in localized (e.g., short-term, targeted, or both) interference that affects one of multiple codewords used to communicate a set of data between a memory device and host device. Accordingly, in some examples, a multi-bit error may occur in one of the codewords but not the others. In such examples, the ability of an error protection technique to detect a multi-bit error in the codeword will be limited by the probability that the error protection technique will detect a multi-bit error in a single codeword. Also, if the error protection technique fails to detect a multi-bit error in a first codeword (caused by localized interference) and no errors are detected in the other codewords, the error protection technique may fail to detect any errors in the communicated set of data.

To increase the probability that a multi-bit error will be detected in at least one of the codewords used to communicate a set of data over a data bus, techniques for increasing the likelihood that localized interference will create multi-bit errors in multiple of the codewords may be established.

In some examples, a memory die 200 retrieves data from a memory array based at least in part on a read command received from a host device. Memory die 200 may generate a first code for detecting (and, in some examples, correcting) one or more errors in a first set of bits of the data and a second code for detecting (and, in some examples, correcting) one or more errors in a second set of bits of the data. The memory die 200 may transmit the first set of bits and the second set of bits to the host device in an interleaved pattern—e.g., an alternating pattern, a checkerboard pattern. The memory die 200 may also transmit the first code and the second code to the host device—e.g., in an interleaved pattern. The host device may process the first set of bits using the first code and the second set of bits using the second code.

In some examples, a host device identifies data for storage in a memory array of a memory die 200. The host device may generate a first code for a first set of bits of the data and a second code for a second set of bits of the data, where the codes may be used to detect (and, in some examples, correct) errors in the respective sets of set of bits. The host device may transmit a write command to the memory die 200 along with the first set of bits and the second set of bits, which may be transmitted in an interleaved pattern—e.g., an alternating pattern, a checkerboard pattern. The host device may also transmit the first code and the second code to the memory die 200—e.g., in an interleaved pattern. The memory die 200 may process the first set of bits using the first code and the second set of bits using the second code to identify whether there are one or more errors in the first set of bits or the second set of bits. If there are no errors detected in the first set of bits or the second set of bits, the memory die 200 may write the first set of bits and the second set of bits to the memory array.

Figure 3:
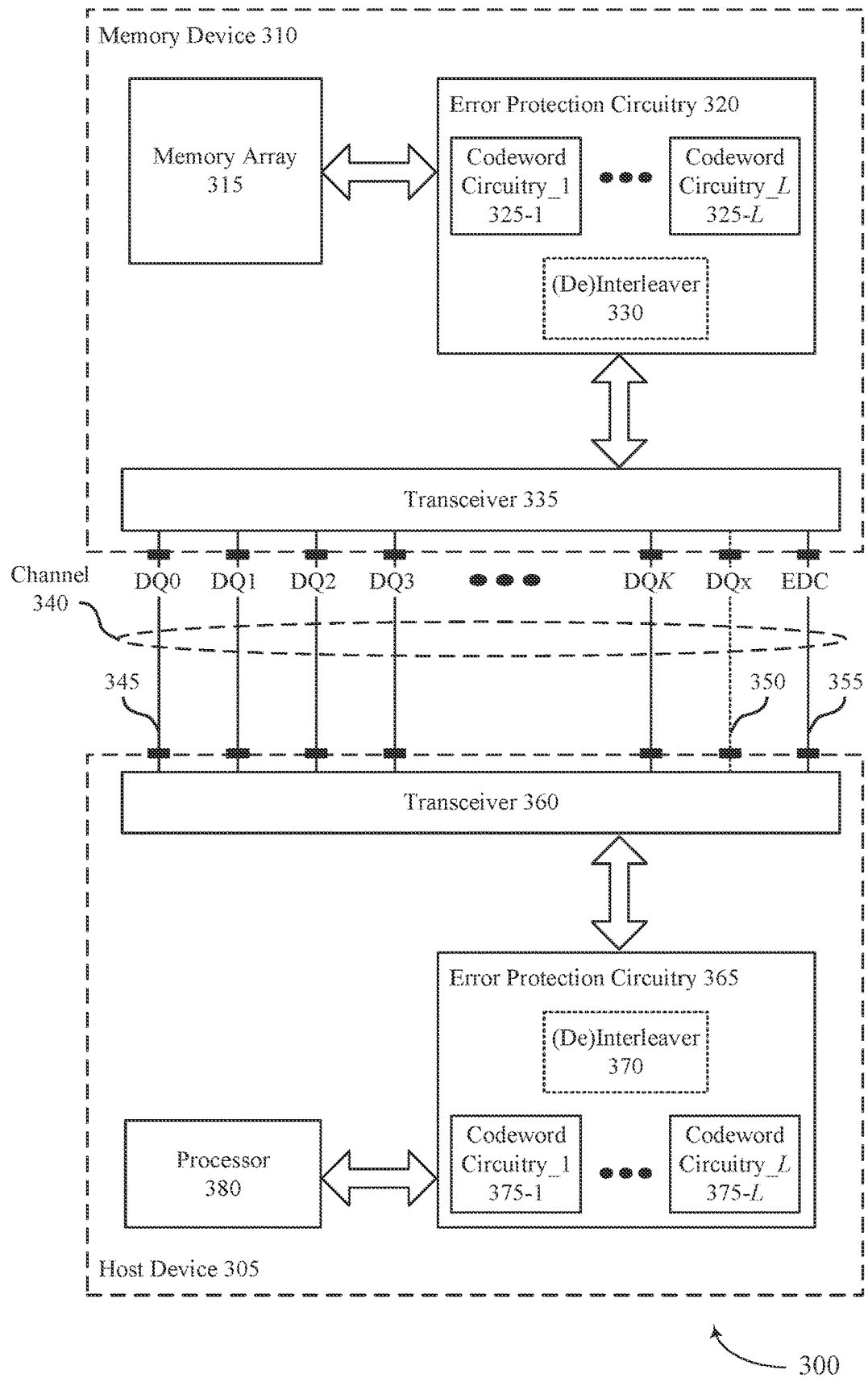
FIG. 3 illustrates an example of a system that supports interleaved codeword transmission for a memory device in accordance with examples as disclosed herein.

FIG. 3 illustrates an example of a system 300 that supports interleaved codeword transmission for a memory device in accordance with examples as disclosed herein.

System 300 depicts host device 305 and memory device 310, which may be examples of host device 105 and memory device 110 and communicate with one another via channel 340 as described with reference to FIG. 1. Channel 340 may include data lines (e.g., DQ0 to DQK, where K may equal 7) for communicating data, including data line 345, and error detection line 355 (e.g., EDC) for communicating error correction codes associated with data communicated over the data lines. Channel 340 may also include a special-purpose line 350 (e.g., DQx), which may be used for data mask/inversion signaling. In some examples, the data lines may be indexed non-sequentially relative to physical locations of the data lines—e.g., data line 345 may be indexed as DQ3, the data line next to data line 345 may be indexed as DQ0, and so on.

Memory device 310 may include memory array 315, which may be an example of a memory array 170, as described with reference to FIG. 1. Memory device 310 may also include error protection circuitry 320 and transceiver 335.

Error protection circuitry 320 may be configured to implement an error protection scheme for data communicated between the host device 305 and the memory device 310 over the channels 340. For example, the error protection circuitry 320 or 365 of the transmitting device may generate error control information for some data bits to be communicated over the channels 340. The receiving device may receive the data bits and the error control information, generate its own error control information from the data bits and compare the generated error control information with the received error control information to determine if there are errors in the data. In some examples, error protection circuitry 320 may implement a CRC-based error protection scheme. In other examples, error protection circuitry 320 may implement a parity-based error protection scheme (e.g., a Hamming code-based error protection scheme). Error protection circuitry 320 may be configured to process multiple codewords for a set of data communicated between memory device 310 and host device 305 over channel 340. Processing codewords may include generating codewords for received data or data to be transmitted, comparing generated codewords against received codewords, applying generated or received codewords to data, or any combination thereof. In some examples, error protection circuitry 320 includes one codeword circuit for processing the multiple codewords received in a communication—e.g., if the multiple codewords are processed sequentially. In other examples, (e.g., if the multiple codewords are processed in parallel) error protection circuitry 320 may include multiple codeword circuits—e.g., first codeword circuitry 325-1 through Lth codeword circuitry 325-L, where L may be greater than or equal to two. Error protection circuitry 320 may also include interleaver 330.

Codeword circuitry 325 may be configured to generate one or more codewords for a set of data stored in memory array 315 and to be communicated from memory device 310 to host device 305—e.g., in response to a read command. In some examples, codeword circuitry 325 may be configured to generate a first codeword for first bits of the set of data and a second codeword for second bits of the set of data. In some examples, codeword circuitry 325 generates a first error protection code (e.g., a CRC or Hamming code) for the first bits (where the first bits and first error protection code form the first codeword) and a second error protection code for the second bits (where the second bits and second error protection code form the second codeword).

Codeword circuitry 325 may also be configured to process one or more codewords for a set of data to be communicated from host device 305 to memory device 310 and stored in memory array 315—e.g., in response to a write command. In some examples, codeword circuitry 325 may be configured to use a first error code associated with first bits of the set of data to detect (and, in some examples, correct) errors in the first bits and to use a second error code associated with second bits of the set of data to detect (and, in some examples, correct) errors in the second bits—e.g., if Hamming codes are used. In other examples, to detect errors, codeword circuitry 325 may be configured to generate a first error code based on first bits of the set of data and compare the first generated error code with a first received error code associated with the first bits and to generate a second error code based on second bits of the set of data and compare the second generated error code with a second received error code associated with the second bits—e.g., if CRCs are used. Error protection circuitry 320 may determine whether to store the data associated with the codewords in memory array 315 based on whether the received error protection codes indicate uncorrectable errors in the codewords—e.g., error protection circuitry 320 may not store the data in memory array 315 if uncorrectable errors are identified.

In some examples, one codeword circuit is used to process the codewords communicated over channel 340. In such cases, the codeword circuit may process the codewords sequentially. In other cases, multiple codewords are used to process the codewords communicated over channel 340. In such cases, for example, first codeword circuitry 325-1 may be used to process a first codeword communicated over channel 340 (e.g., using a first corresponding error code); and Lth codeword circuitry 325-L may be used to process an Lth codeword communicated over channel 340 (e.g., using an Lth corresponding error code). In some examples, intervening codeword circuitry may be used to process additional codewords.

Interleaver 330 may be configured to interleave codewords (e.g., received from codeword circuitry 325) before transmitting the codewords over channel 340. In some examples, interleaver 330 may be configured to transmit bits of the codewords over a set of data lines during a set of unit intervals (e.g., over certain data line/unit interval pairs) such that the bits of the different codewords are interleaved together. In some examples, the bits of the different codewords are interleaved in an alternating pattern. For example, interleaver 330 may be configured to transmit, during a first unit interval, bits of a first codeword over a first subset of data lines (e.g., the evenly indexed data lines) and bits of a second codeword over a second subset of data lines (e.g., the oddly indexed data lines), and, during a second unit interval, bits of the first codeword over the second subset of data lines and bits of the second codeword over the first subset of data lines. The interleaver 330 may continue to alternate which subset of data lines the codeword bits are transmitted over in the subsequent unit intervals. Example of interleaving patterns are described in more detail herein and with reference to FIGS. 4 and 5.

In some examples, the bits of the different codewords are interleaved in a pattern that increases a probability that interference (e.g., cross-link interference) experienced by one codeword will also be experienced by other codewords (e.g., by transmitting the codeword over physically alternating data lines that correspond to the actual physical location of the pins of a package). That is, two data lines coupled with two physically adjacent data pins may be used to communicate bits from different codewords—e.g., during a unit interval, if data line 345 is used to communicate bits of a first codeword, a second data line adjacent to data line 345 may be used to communicate bits of a second codeword, a third data line adjacent to the second data line may be used to communicate bits of the first codeword (or a third codeword), and so on. In some examples, interleaver 330 may be programmed with one or more mappings between data line/unit interval pairs and the different codewords—e.g., different mappings may be based on a quantity of codewords, a type of interference expected for channel 340. Interleaver 330 may use the mapping to determine which bits of the codewords are to be transmitted over which data line/unit interval pairs.

Interleaver 330 may also be configured to separate interleaved codewords (which may also be referred to as deinterleaving) that are received over channel 340. In some examples, interleaver 330 may be configured to reconstruct the bits of the interleaved codewords into separate codewords. Interleaver 330 may be programmed with a mapping between data line/unit interval pairs and the different codewords. Interleaver 330 may use the mapping to determine which bits communicated over channel 340 correspond to which codewords. In some examples, interleaver 330 sends the reconstructed codewords to one or more codeword circuits. For example, interleaver 330 may send the codewords to one codeword circuit—e.g., sequentially. Or interleaver 330 may send to codeword to respective codeword circuits, such as first codeword circuitry 325-1 through Lth codeword circuitry 325-L—e.g., in parallel.

Transceiver 335 may be configured to transmit and receive information over channel 340. In some examples, transceiver 335 include multiple drivers that are used to transmit information to host device 305 over channel 340. Transceiver 335 may also include a receive chain including a comparator and, in some examples, differential equalization circuitry, that is used to receive information from host device 305 over channel 340.

By transmitting interleaved codewords, a probability that error protection circuitry 320 will detect a multi-bit error in at least one of the interleaved codewords may be increased—e.g., because if codewords are interleaved, short-term interference that would otherwise affect a single codeword may affect both interleaved codewords.

Host device 305 may include processor 380, which may be an example of processor 125 of FIG. 1. Host device 305 may also include host error protection circuitry 365 and host transceiver 360.

Host error protection circuitry 365 may implement an error protection scheme, as similarly described with reference to error protection circuitry 320. Host error protection circuitry 365 may include host codeword circuitry 375 and host interleaver 370.

Host codeword circuitry 375 may be configured to generate one or more codewords for a set of data to be written to memory array 315 (e.g., based on generating a write command), as similarly described with reference to codeword circuitry 325. Host codeword circuitry 375 may also be configured to process one or more codewords received from memory device 310 (e.g., in response to issuing a read command), as similarly described with reference to codeword circuitry 325.

Host interleaver 370 may be configured to interleave codewords prior to transmitting the codewords over channel 340, as similarly described with reference to interleaver 330. Host interleaver 370 may also be configured to deinterleave codewords after receiving interleaved codewords over channel 340, as similarly described with reference to interleaver 330.

Figure 4:
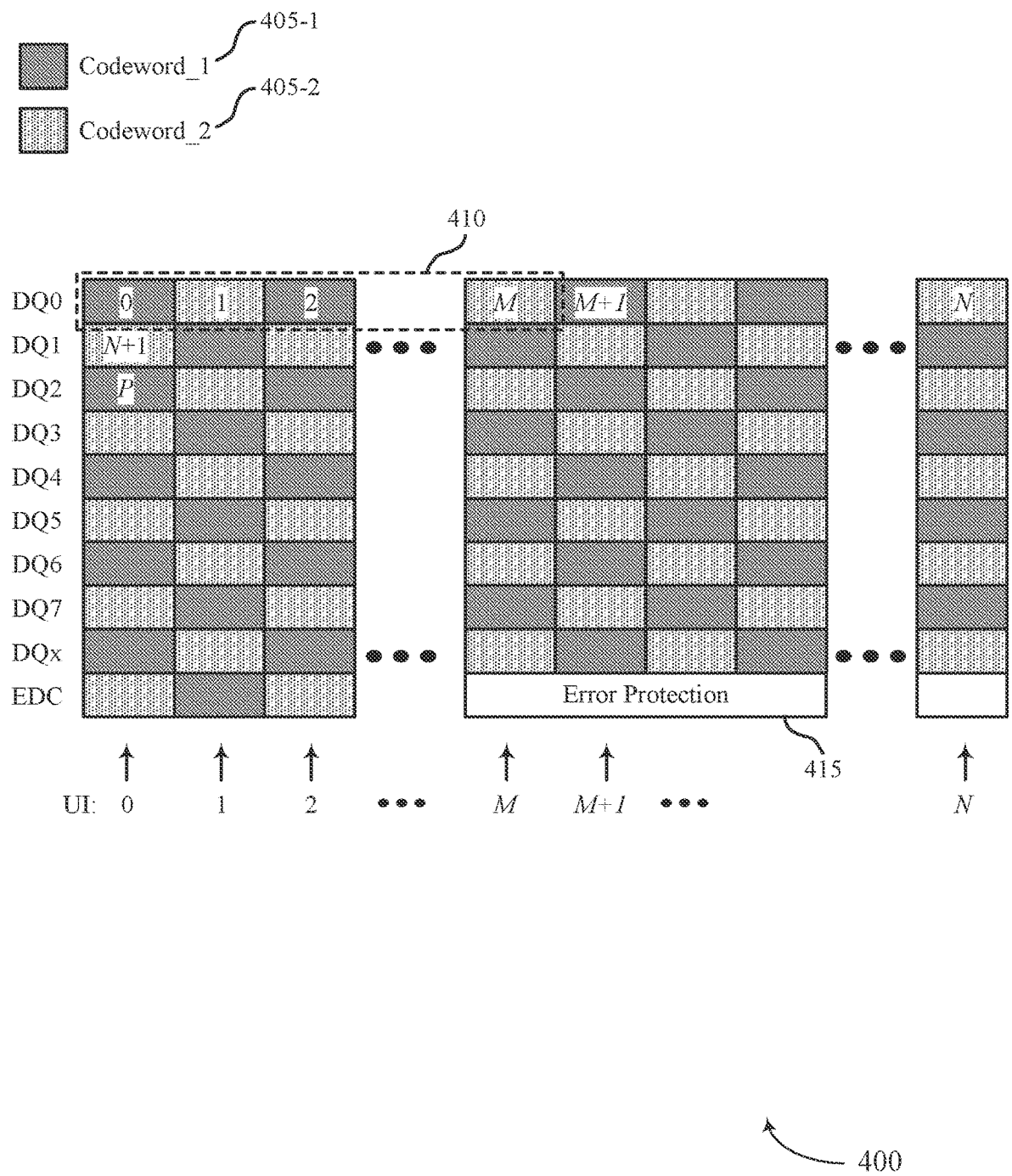
FIGS. 4 and 5 illustrate example signal maps that support interleaved codeword transmission for a memory device in accordance with examples as disclosed herein.

FIG. 4 illustrates an example of a signal map that supports interleaved codeword transmission for a memory device in accordance with examples as disclosed herein.

Signal map 400 depicts an interleaving pattern associated with transmitting two interleaved codewords over a channel between a memory device and a host device (e.g., channel 340 between memory device 310 and host device 305 of FIG. 3). Signal map 400 may depict the transmission of signals over communication lines (e.g., DQ lines, a DQx line, EDC lines) across multiple unit intervals (e.g., UI_0 to UI_N). In some examples, a unit interval may be referred to as a beat. In some examples, a set of N unit intervals may be referred to as a burst. In some examples, a set quantity of data may be communicated during a burst (e.g., 256 bits).

Each signal transmitted over a communication line during a unit interval (e.g., during a communication line/unit interval pair) may correspond to a bit of information (e.g., if a binary modulation technique is used) or multiple bits of information (e.g., if a multi-level modulation technique is used). In some examples, the communication line/unit interval pairs may be indexed from left to right and from top to bottom, as depicted in FIG. 4. The index M may be equal to 15, and the index N may be equal to 31.

In some examples, the communication lines depicted in signal map 400 are physically arranged in an order that corresponds to a logical representation of the communication lines—that is, DQ1 may be positioned between DQ0 and DQ2; DQ2 may be positioned between DQ1 and DQ3; and so on through DQx, which may be positioned between DQ7 and EDC. To increase a likelihood that short-term interference affecting one communication line (e.g., a ball open or short) or physically-adjacent communication lines (e.g., cross-link interference between DQ0 and DQ1) will affect both codewords, the codewords may be transmitted over alternating communication lines—e.g., first codeword 405-1 may be transmitted over DQ0, DQ2, DQ4, and so on, and second codeword 405-2 may be transmitted over DQ1, DQ3, DQ5, and so on. Window 410 may depict signals transmitted over DQ0 that are affected by localized interference that occurs during M unit intervals. To increase a likelihood that short-term interference affecting time-adjacent transmissions (e.g., a temporary ball open or short) will affect both codewords, the codewords may be transmitted in alternating unit intervals—e.g., first codeword 405-1 may be transmitted during UI_0, UI_2, and so on, and second codeword 405-2 may be transmitted during UI_1, UI_3, and so on.

In some examples, the preceding techniques may be combined so that the two codewords are transmitted over alternating sets of communication lines in alternating unit intervals (e.g., in the chessboard pattern depicted in FIG. 4). Transmitting the two codewords over alternating set of communication lines in alternating unit interval may increase a statistical independence of the code words. Transmitting the two codewords over alternating set of communication lines in alternating unit interval may also increase a likelihood that localized interference (e.g., interference on one communication line or that affects one clock cycle) will affect both codewords. In some examples, the probability of detecting a multi-bit error in at least one of the two codewords is based on the equation $P(MBE)_{2CW}=P(MBE)_{1CW}+(1-P(MBE)_{1CW})*P(MBE)_{1CW}$. For a CRC-based error protection technique, the equation may be rewritten as $P(MBE_{CRC})_{2CW}=(1-2^{-e})+(1-(1-2^{-e}))*(1-2^{-e})$, which may be reduce to $1-2^{-2e}$. For a Hamming code-based error protection technique, the equation may be rewritten as $P(MBE_{CRC})_{2CW}=(1-(d+e+1)*2^{-e})+(1-(1-(d+e+1)*2^{-e}))*(1-(d+e+1)*2^{-e})$.

In some examples, the data bits (or encoded data bits) of the two codewords may be transmitted over DQ0 line through DQx line during each unit interval and over the EDC line during a subset of the unit intervals. For the remaining unit intervals, error protection bits 415 may be communicated over the EDC line. In some examples, error protection bits 415 (e.g., CRC or parity bits) for both codewords may be transmitted over EDC line. In some examples, the error protection bits for first codeword 405-1 are interleaved with the error protection bits for second codeword 405-2—e.g., in an alternating pattern.

In some examples, a different quantity of data lines may be used—e.g., more or less than eight data lines may be used to communicate information. In some examples, the DQx line may be omitted—e.g., if a data mask/inversion operation is not used.

In some examples, a memory device (e.g., memory device 310 of FIG. 3) may generate first codeword 405-1 and second codeword 405-2 for a set of data retrieved from a memory array in response to a read command. First codeword 405-1 may include first data bits and a first error protection code, and second codeword 405-2 may include second data bits and a second error protection code. The data bits of the codeword may be represented by the shaded blocks in signal map 400, while the error protection codes of the codewords may be included in the error protection bits 415.

After generating the codewords 405, the memory device may interleave the codewords—e.g., prior to or during transmission. In some examples, the memory device interleaves the data bits of the codewords to obtain interleaved data, where the first data bit of first codeword 405-1 is adjacent to the first data bit of second codeword 405-2, the second data bit of first codeword 405-1 is adjacent to the first data bit of second codeword 405-2, and so on. In some examples, the memory device may map the interleaved data to data line/unit interval pairs. In some examples, the first bit of the interleaved data (which may correspond to the first data bit of first codeword 405-1) may be mapped to the first data line/unit interval index (e.g., index 0), the second bit of the interleaved data (which may correspond to the first data bit of second codeword 405-2) may be mapped to the first data line/unit interval index (e.g., index 1), the third bit of the interleaved data (which may correspond to the second data bit of first codeword 405-1) may be mapped to the third data line/unit interval index (e.g., index 2), and so on. Alternatively, the first bit of the interleaved data (which may correspond to the first data bit of first codeword 405-1) may be mapped to the first data line/unit interval index (e.g., index 0), the second bit of the interleaved data (which may correspond to the first data bit of second codeword 405-2) may be mapped to the (N+1)th data line/unit interval index (e.g., index N+1), the third bit of the interleaved data (which may correspond to the second data bit of first codeword 405-1) may be mapped to the Pth data line/unit interval index (e.g., index P), and so on. Based on mapping the bits of the interleaved data to the data line/unit interval pairs, the memory device may transmit, via a channel, the data bits using the data line/unit interval pairs corresponding to the indices assigned to the data bits.

In some examples, the data bits of the codewords may be mapped to the data line/unit interval pairs in real-time. For example, the interleaver may map the first five bits of first codeword 405-1 to the evenly indexed data lines in the first unit interval (UI_0) and the first five bits of second codeword 405-2 to the oddly indexed data lines in the first unit interval (UI_1). In some examples, during the next unit interval (UI_1), the interleaver may map the next five bits of first codeword 405-1 to the oddly indexed data lines) and the next five bits of second codeword 405-2 to the evenly indexed data lines. By alternating the data lines to which a set of data bits of a codeword is mapped, a checkerboard pattern may be obtained. In both cases, the memory device may also transmit, via the channel, the bits of the error protection codes to the host device—e.g., in an alternating manner.

The host device may receive the interleaved data bits from the memory device over the channel. In some examples, the host device reconstructs the first codeword 405-1 and second codeword 405-2—e.g., based on grouping (and, in some examples, rearranging) the received bits in accordance with the mapping. In some examples, the host device groups the data bits received over the evenly indexed data lines in the first unit interval (UI_0) with the data bits received over the oddly indexed data lines in the second unit interval (UI_1), and so on, to reconstruct the first codeword 405-1. The host device may also group the data bits received over the oddly indexed data lines in the first unit interval (UI_0) with the data bits received over the evenly indexed data lines in the second unit interval (UI_1), and so on, to reconstruct the second codeword 405-2. Depending on how the data bits of the codewords are mapped to the data line/unit interval pairs, the host device may rearrange the grouped data bits to achieve the original ordering.

The host device may similarly reconstruct the codes of first codeword 405-1 and second codeword 405-2. In some examples, the host device may use the codes to determine whether errors occurred during transmission of the codewords to the host device. In some examples, the host device identifies a multi-bit error in the data bits of one or both of first codeword 405-1 or second codeword 405-2—e.g., caused by interference during window 410. In examples where the host device identifies a multi-bit error in one of first codeword 405-1 or second codeword 405-2, the host device may determine that a multi-bit error also occurred in the other codeword. In some examples, after detecting a multi-bit error, the host device may discard the data bits.

A host device (e.g., host device 305 of FIG. 3) may similarly generate codewords for a set of data and transmit the codewords to a memory device in an interleaved pattern—e.g., after identifying data for storage in the memory array. The host device may also issue a write command. A memory device may receive the interleaved data and reconstruct the codewords and check for errors as similarly described above with reference to the host device receiving the interleaved codewords. In some examples, the memory device may determine whether to store the data in the memory array based on the result of the error detection operation—e.g., the memory device may discard the data if a multi-bit error is detected in one or both of the codewords received from the host device.

Figure 5:
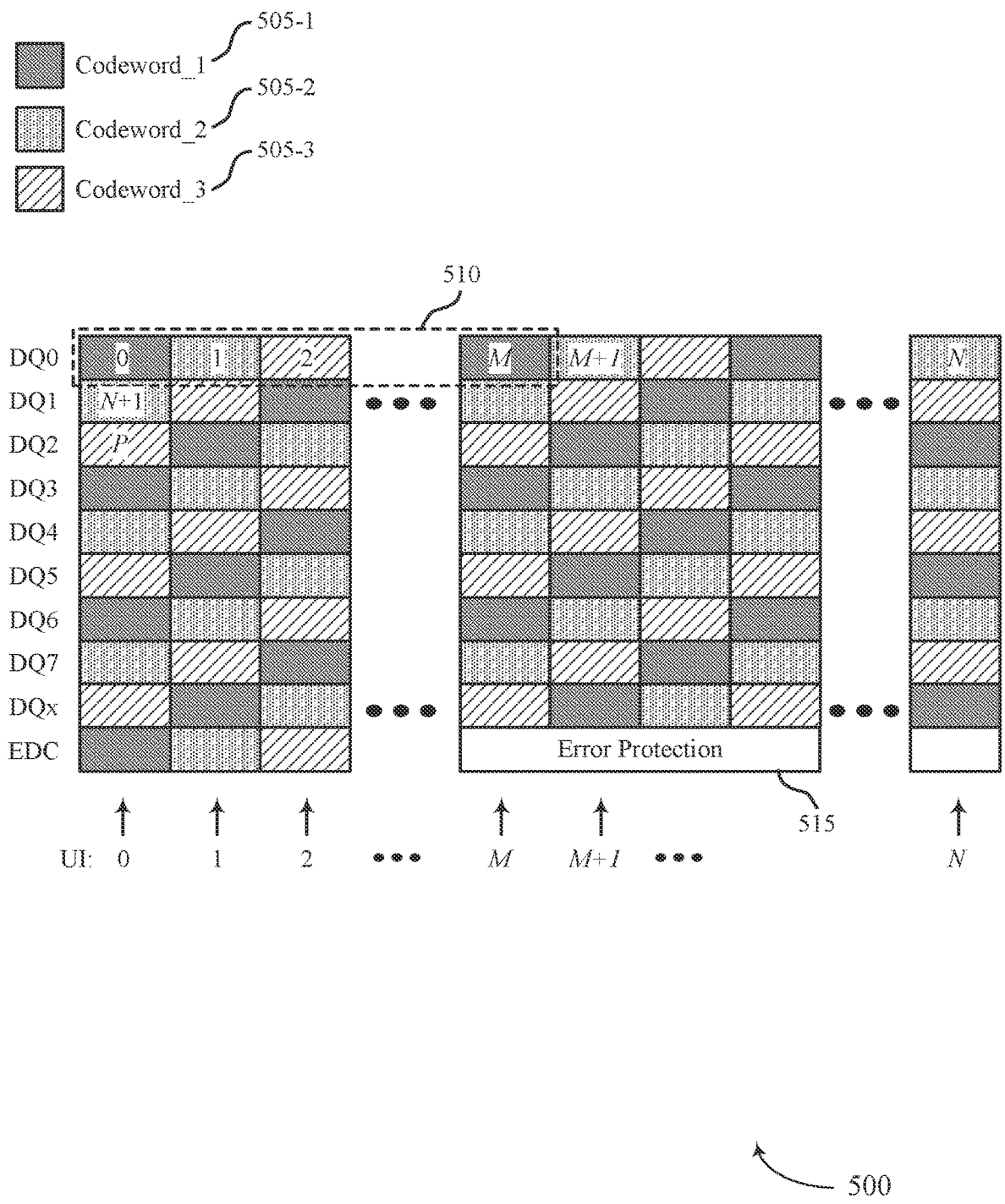

FIG. 5 illustrates an example of a signal map that supports interleaved codeword transmission for a memory device in accordance with examples as disclosed herein.

Signal map 500 depicts an interleaving pattern associated with transmitting three interleaved codewords over a channel between a memory device and a host device (e.g., channel 340 between memory device 310 and host device 305 of FIG. 3). Data bits (or encoded data bits) of the three codewords (first codeword 505-1, second codeword 505-2, and third codeword 505-3) may be mapped to the communication line/unit interval pairs in an alternating pattern, as shown in FIG. 5. Interleaving the data bits of the three codewords may increase a likelihood that short-term interference (e.g., interference to DQ0 that occurs during the first M unit intervals) affects the three codewords, as similarly described with reference to FIG. 4.

Window 510 may depict signals transmitted over DQ0 that are affected by localized interference that occurs during M unit intervals. To increase a likelihood that short-term interference affecting time-adjacent transmissions (e.g., a temporary ball open or short) will affect the three codewords, the codewords may be transmitted in alternating unit intervals—e.g., first codeword 505-1 may be transmitted during UI_0, second codeword 505-2 may be transmitted during UI_2, third codeword 505-3 may be transmitted during UI_3, and this pattern may be repeated. The error correction bits 515 of the three codewords transmitted over the EDC line may also be interleaved—e.g., in an alternating pattern.

Similar techniques may be used to transmit an increased quantity of codewords used to communicate a set of data between a memory device and a host device. In some examples, regardless of the quantity of codewords used, the technique used to interleave codewords may increase a statistical independent of the codewords, while increasing a likelihood that interference that is localized to a communication line, adjacent communication lines, a unit interval, adjacent unit intervals, or any combination thereof, will affect at least two (and, in some examples, all) of the codewords transmitted during a burst.

In some examples, a pattern of a signal map, such as signal map 400 of FIG. 4 or signal map 500, may not depict an alternating pattern, though an alternating pattern may be used based on a physical layout of the communication lines. That is, in some examples, DQ0, DQ1, and DQ2 may not correspond to physically adjacent communication lines. In such cases, from a logical standpoint, a signal map may not depict a checkerboard pattern, but from a physical standpoint, the signal map may depict a checkerboard pattern—e.g., if the indexed communication lines are rearranged in accordance with a physical layout of the indexed communication lines and/or an actual physical location of the pins of a package.

Figure 6:
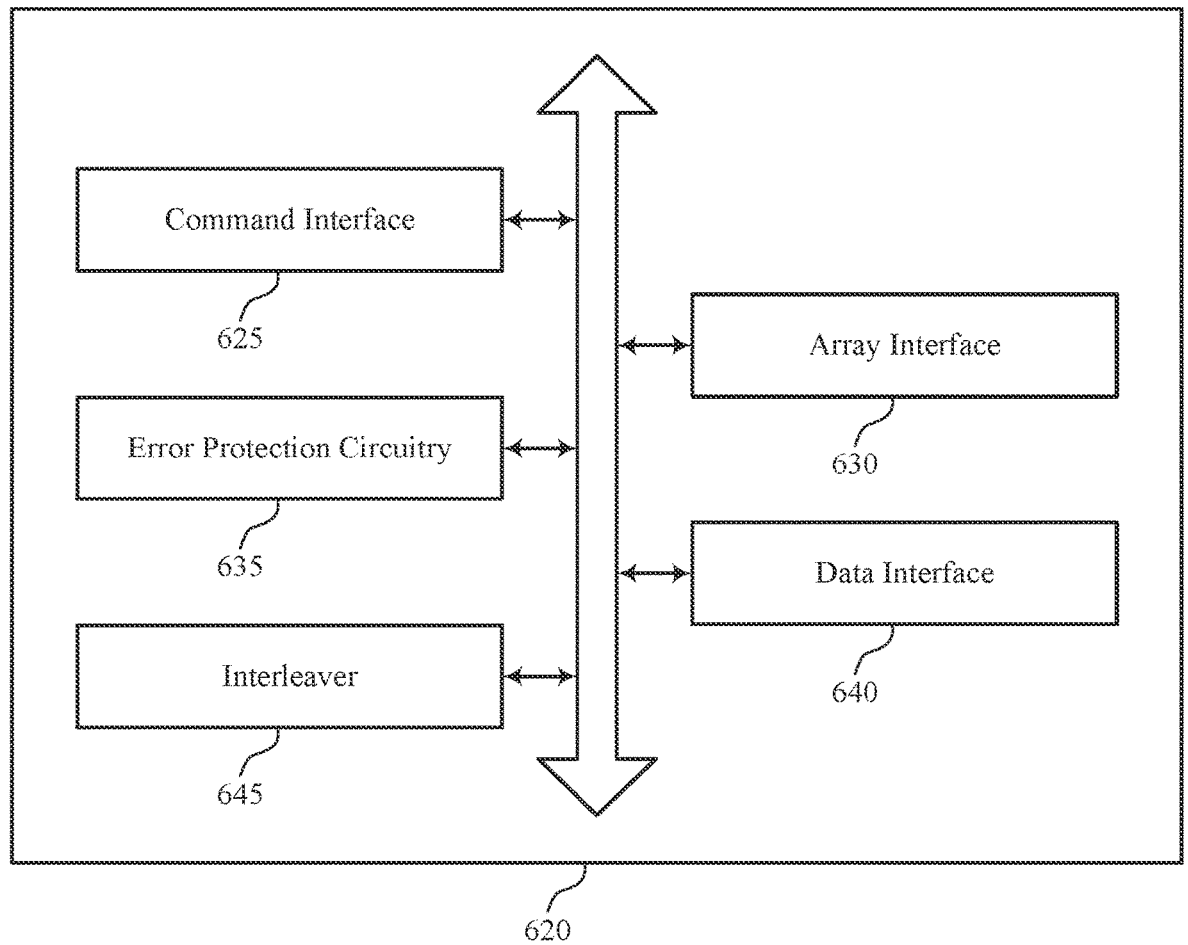
FIG. 6 shows a block diagram of a memory device that supports interleaved codeword transmission for a memory device in accordance with examples as disclosed herein.

FIG. 6 shows a block diagram 600 of a memory device 620 that supports interleaved codeword transmission for a memory device in accordance with examples as disclosed herein. The memory device 620 may be an example of aspects of a memory device as described with reference to FIGS. 1 through 5. The memory device 620, or various components thereof, may be an example of means for performing various aspects of interleaved codeword transmission for a memory device as described herein. For example, the memory device 620 may include a command interface 625, an array interface 630, an error protection circuitry 635, a data interface 640, an interleaver 645, or any combination thereof. Each of these components may communicate, directly or indirectly, with one another (e.g., via one or more buses).

The command interface 625 may be configured as or otherwise support a means for receiving, from a host device, a read command to retrieve data from a memory array. The array interface 630 may be configured as or otherwise support a means for retrieving the data from the memory array based at least in part on the read command. The error protection circuitry 635 may be configured as or otherwise support a means for generating, based at least in part on retrieving the data, a first code for detecting one or more errors in a first set of bits of the data and a second code for detecting one or more errors in a second set of bits of the data. The data interface 640 may be configured as or otherwise support a means for transmitting, to the host device, the first code and the second code, and the first set of bits interleaved with the second set of bits.

In some examples, to support transmitting the first set of bits interleaved with the second set of bits, the data interface 640 may be configured as or otherwise support a means for transmitting, during a first unit interval, a first portion of the first set of bits over first data lines and a first portion of the second set of bits over second data lines. In some examples, to support transmitting the first set of bits interleaved with the second set of bits, the data interface 640 may be configured as or otherwise support a means for transmitting, during a second unit interval, a second portion of the first set of bits over the second data lines and a second portion of the second set of bits over the first data lines.

In some examples, each data line of the first data lines are physically separated from other data lines of the first data lines by at least one data line of the second data lines.

In some examples, to support transmitting the first set of bits interleaved with the second set of bits, the data interface 640 may be configured as or otherwise support a means for transmitting the first set of bits over a first subset of pins of the memory device and the second set of bits over a second subset of pins of the memory device, each pin of first subset of pins being physically adjacent to at least one pin of the second subset of pins.

In some examples, the error protection circuitry 635 may be configured as or otherwise support a means for generating a third code for detecting one or more errors in third set of bits of the data, where transmitting the first set of bits interleaved with the second set of bits includes transmitting the first set of bits, the second set of bits, and the third set of bits.

In some examples, to support transmitting the first set of bits, the second set of bits, and the third set of bits, the data interface 640 may be configured as or otherwise support a means for transmitting, during a first unit interval, a first portion of the first set of bits over first data lines, a first portion of the second set of bits over second data lines, and a first portion of the third set of bits over third data lines. In some examples, to support transmitting the first set of bits, the second set of bits, and the third set of bits, the data interface 640 may be configured as or otherwise support a means for transmitting, during a second unit interval, a second portion of the first set of bits over the third data lines, a second portion of the second set of bits over the first data lines; and a second portion of the third set of bits over the second data lines.

In some examples, to support transmitting the first set of bits, the second set of bits, and the third set of bits, the data interface 640 may be configured as or otherwise support a means for transmitting, during a third unit interval, a third portion of the first set of bits over the second data lines, a third portion of the second set of bits over the third data lines, and a third portion of the third set of bits over the first data lines.

In some examples, to support transmitting the first code and the second code, the data interface 640 may be configured as or otherwise support a means for transmitting, via a line associated with communicating error control information, the first code interleaved with the second code.

In some examples, the interleaver 645 may be configured as or otherwise support a means for interleaving, the first set of bits and the second set of bits to generate interleaved data, where, starting with an initial bit of the interleaved data, set of bits of the interleaved data correspond to respective data line and unit interval pairs.

In some examples, the first code or the second code includes an CRC code, an error correction code (ECC), an error detection code (EDC), or a combination hereof.

In some examples, the command interface 625 may be configured as or otherwise support a means for receiving, from a host device, a write command to store data in a memory array. In some examples, the data interface 640 may be configured as or otherwise support a means for receiving, from the host device and based at least in part on the write command, a first set of bits of the data interleaved with a second set of bits of the data, a first code for detecting one or more errors in the first set of bits, and a second code for detecting one or more errors in the second set of bits. In some examples, the error protection circuitry 635 may be configured as or otherwise support a means for determining whether the first set of bits include the one or more errors using the first code and whether the second set of bits include the one or more errors using the second code. In some examples, the array interface 630 may be configured as or otherwise support a means for writing the first set of bits and the second set of bits to the memory array based at least in part on the determination.

In some examples, to support receiving the first set of bits interleaved with the second set of bits, the data interface 640 may be configured as or otherwise support a means for receiving, during a first unit interval, a first portion of the first set of bits over first data lines and a first portion of the second set of bits over second data lines. In some examples, to support receiving the first set of bits interleaved with the second set of bits, the data interface 640 may be configured as or otherwise support a means for receiving, during a second unit interval, a second portion of the first set of bits over the second data lines and a second portion of the second set of bits over the second data lines.

In some examples, to support receiving the first set of bits, the second set of bits, and the third set of bits, the data interface 640 may be configured as or otherwise support a means for receiving, during a first unit interval, a first portion of the first set of bits over first data lines, a first portion of the second set of bits over second data lines, and a first portion of the third set of bits over third data lines. In some examples, to support receiving the first set of bits, the second set of bits, and the third set of bits, the data interface 640 may be configured as or otherwise support a means for receiving, during a second unit interval, a second portion of the first set of bits over the third data lines, a second portion of the second set of bits over the first data lines, and a third portion of the third set of bits over the second data lines.

In some examples, to support receiving the first code and the second code, the data interface 640 may be configured as or otherwise support a means for receiving the first code interleaved with the second code.

In some examples, to support determining whether the first set of bits include the one or more errors using the first code and whether the second set of bits include the one or more errors using the second code, the error protection circuitry 635 may be configured as or otherwise support a means for determining that the first set of bits include at least one error based at least in part on the first code.

In some examples, to support writing the first set of bits and the second set of bits to the memory array, the array interface 630 may be configured as or otherwise support a means for refraining from writing the first set of bits and the second set of bits to the memory array based at least in part on the first set of bits including the at least one error.

In some examples, to support determining whether the first set of bits include the one or more errors using the first code and whether the second set of bits include the one or more errors using the second code, the error protection circuitry 635 may be configured as or otherwise support a means for determining that the first set of bits and the second set of bits are free from the one or more errors based at least in part on the first code and the second code.

Figure 7:
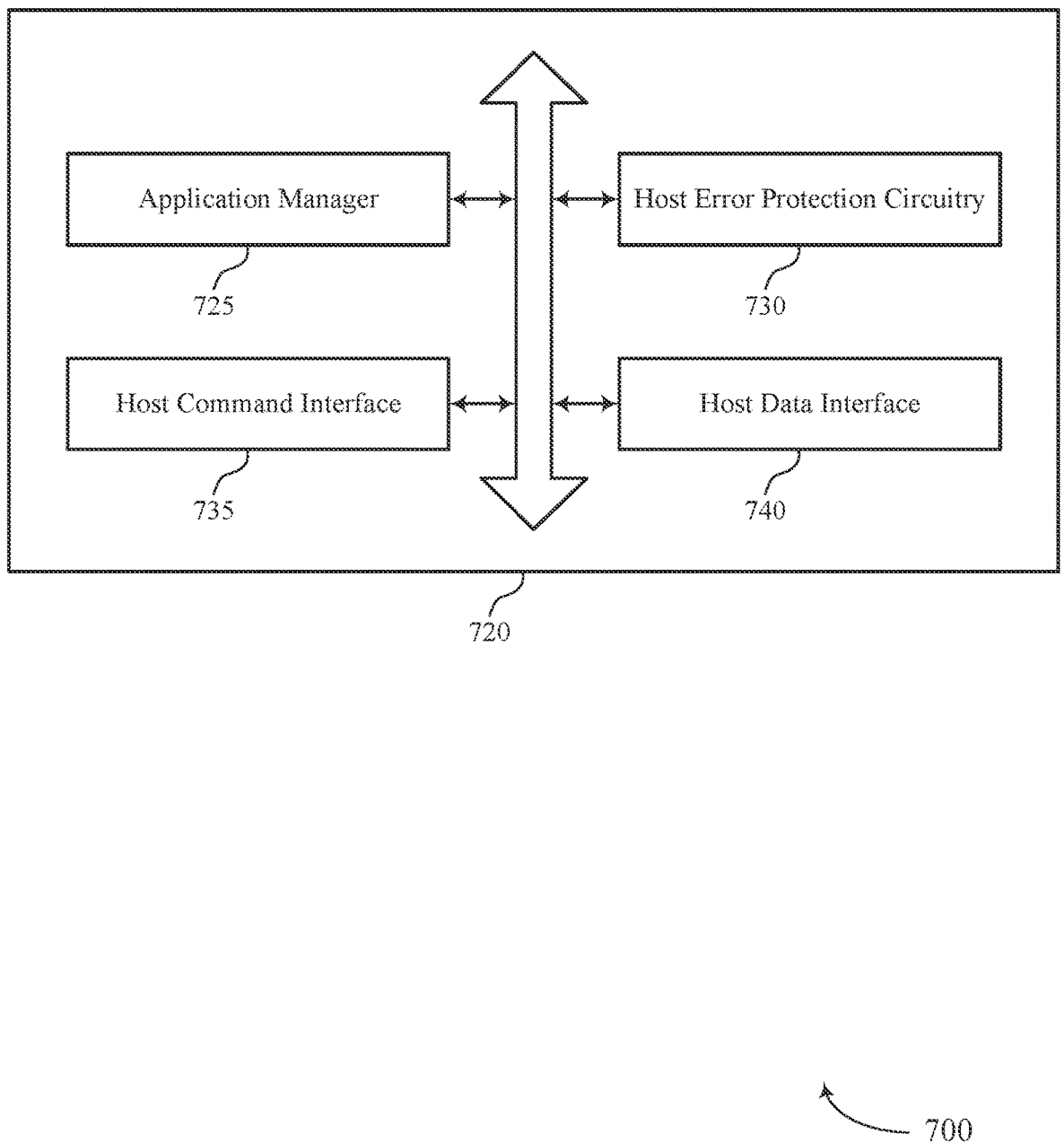
FIG. 7 shows a block diagram of a host device that supports interleaved codeword transmission for a memory device in accordance with examples as disclosed herein.

FIG. 7 shows a block diagram 700 of a host device 720 that supports interleaved codeword transmission for a memory device in accordance with examples as disclosed herein. The host device 720 may be an example of aspects of a host device as described with reference to FIGS. 1 through 5. The host device 720, or various components thereof, may be an example of means for performing various aspects of interleaved codeword transmission for a memory device as described herein. For example, the host device 720 may include an application manager 725, a host error protection circuitry 730, a host command interface 735, a host data interface 740, or any combination thereof. Each of these components may communicate, directly or indirectly, with one another (e.g., via one or more buses).

The application manager 725 may be configured as or otherwise support a means for identifying data for storage in a memory array of a memory device. The host error protection circuitry 730 may be configured as or otherwise support a means for generating, based at least in part on identifying the data, a first code for detecting one or more errors in a first set of bits of the data and a second code for detecting one or more errors in a second set of bits of the data. The host command interface 735 may be configured as or otherwise support a means for transmitting, to the memory device, a write command to store the data in the memory array. The host data interface 740 may be configured as or otherwise support a means for transmitting, to the memory device and based at least in part on the write command, the first code and the second code, and the first set of bits interleaved with the second set of bits.

In some examples, to support transmitting the first set of bits interleaved with the second set of bits, the host data interface 740 may be configured as or otherwise support a means for transmitting, during a first unit interval, a first portion of the first set of bits over first data lines and a first portion of the second set of bits over second data lines. In some examples, to support transmitting the first set of bits interleaved with the second set of bits, the host data interface 740 may be configured as or otherwise support a means for transmitting, during a second unit interval, a second portion of the first set of bits over the second data lines and a second portion of the second set of bits over the first data lines.

In some examples, the host error protection circuitry 730 may be configured as or otherwise support a means for generating a third code for detecting one or more errors in third set of bits of the data, where transmitting the first set of bits interleaved with the second set of bits includes transmitting the first set of bits, the second set of bits, and the third set of bits.

In some examples, to support transmitting the first code and the second code, the host data interface 740 may be configured as or otherwise support a means for transmitting, via a line associated with communicating error protection information, the first code interleaved with the second code.

In some examples, the host command interface 735 may be configured as or otherwise support a means for transmitting, to a memory device, a read command to retrieve data from a memory array. In some examples, the host data interface 740 may be configured as or otherwise support a means for receiving, from the memory device and based at least in part on the read command, a first set of bits of the data interleaved with a second set of bits of the data, a first code for detecting one or more errors in the first set of bits, and a second code for detecting one or more errors in the second set of bits. In some examples, the host error protection circuitry 730 may be configured as or otherwise support a means for processing the first set of bits and the second set of bits based at least in part on the first code and the second code.

In some examples, to support receiving the first set of bits interleaved with the second set of bits, the host data interface 740 may be configured as or otherwise support a means for receiving, during a first unit interval, a first portion of the first set of bits over first data lines and a first portion of the second set of bits over second data lines. In some examples, to support receiving the first set of bits interleaved with the second set of bits, the host data interface 740 may be configured as or otherwise support a means for receiving, during a second unit interval, a second portion of the first set of bits over the second data lines and a second portion of the second set of bits over the second data lines.

In some examples, to support receiving the first set of bits, the second set of bits, and the third set of bits, the host data interface 740 may be configured as or otherwise support a means for receiving, during a first unit interval, a first portion of the first set of bits over first data lines, a first portion of the second set of bits over second data lines, and a first portion of the third set of bits over third data lines. In some examples, to support receiving the first set of bits, the second set of bits, and the third set of bits, the host data interface 740 may be configured as or otherwise support a means for receiving, during a second unit interval, a second portion of the first set of bits over the third data lines, a second portion of the second set of bits over the first data lines, and a third portion of the third set of bits over the second data lines.

In some examples, to support receiving the first code and the second code, the host data interface 740 may be configured as or otherwise support a means for receiving the first code interleaved with the second code.

In some examples, the host error protection circuitry 730 may be configured as or otherwise support a means for determining whether the first set of bits include the one or more errors using the first code and whether the second set of bits include the one or more errors using the second code, where processing the first set of bits and the second set of bits is based at least in part on the determination.

In some examples, the host error protection circuitry 730 may be configured as or otherwise support a means for determining that the first set of bits include at least one error based at least in part on the first code.

In some examples, to support processing the first set of bits and the second set of bits, the application manager 725 may be configured as or otherwise support a means for refraining from processing the first set of bits and the second set of bits based at least in part on the first set of bits including the at least one error.

Figure 8:
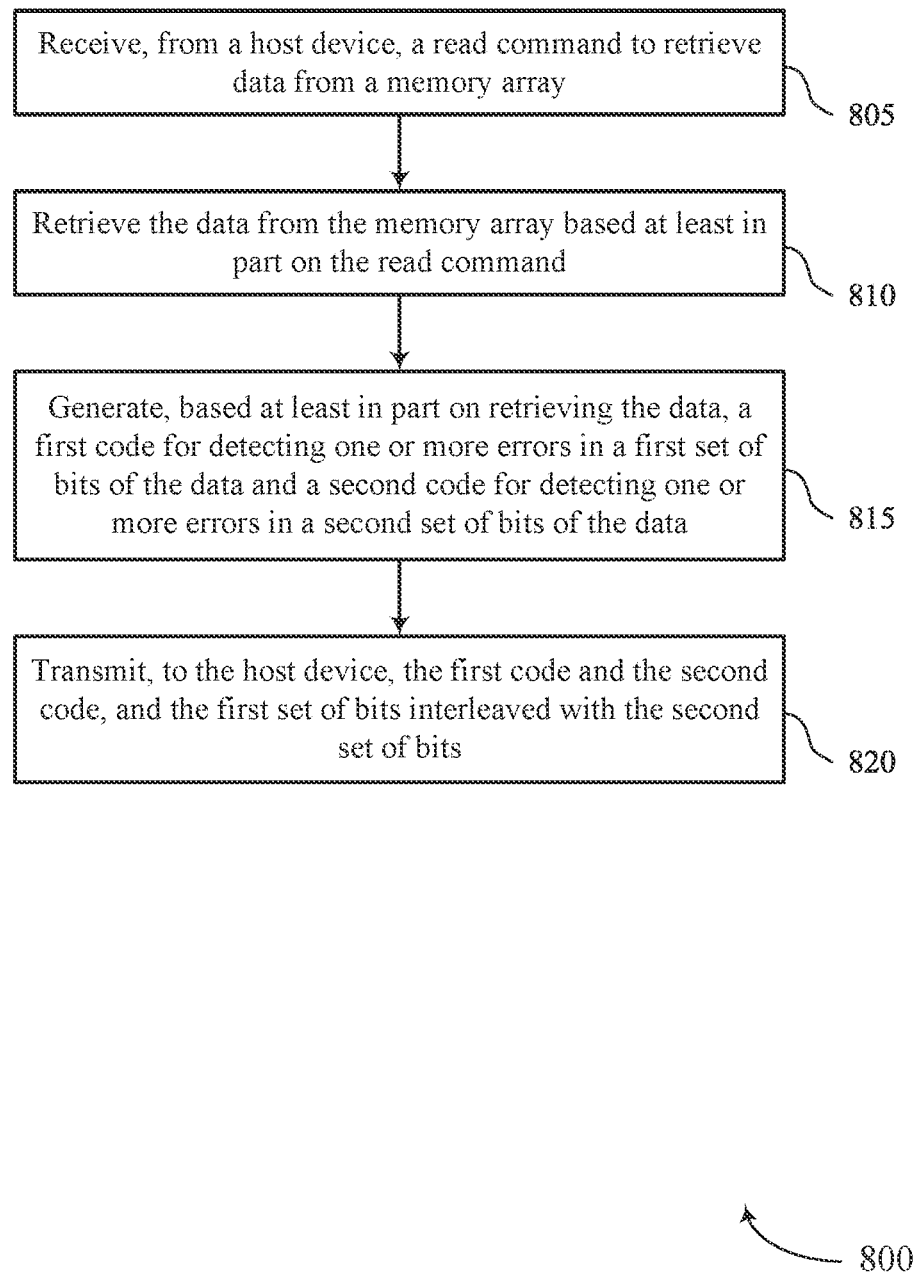
FIGS. 8 through 11 show flowcharts illustrating a method or methods that support interleaved codeword transmission for a memory device in accordance with examples as disclosed herein.

FIG. 8 shows a flowchart illustrating a method 800 that supports interleaved codeword transmission for a memory device in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 805, the method may include receiving, from a host device, a read command to retrieve data from a memory array. The operations of 805 may be performed in accordance with examples as disclosed herein. In some examples, aspects of the operations of 805 may be performed by a command interface 625 as described with reference to FIG. 6.

At 810, the method may include retrieving the data from the memory array based at least in part on the read command. The operations of 810 may be performed in accordance with examples as disclosed herein. In some examples, aspects of the operations of 810 may be performed by an array interface 630 as described with reference to FIG. 6.

At 815, the method may include generating, based at least in part on retrieving the data, a first code for detecting one or more errors in a first set of bits of the data and a second code for detecting one or more errors in a second set of bits of the data. The operations of 815 may be performed in accordance with examples as disclosed herein. In some examples, aspects of the operations of 815 may be performed by an error protection circuitry 635 as described with reference to FIG. 6.

At 820, the method may include transmitting, to the host device, the first code and the second code, and the first set of bits interleaved with the second set of bits. The operations of 820 may be performed in accordance with examples as disclosed herein. In some examples, aspects of the operations of 820 may be performed by a data interface 640 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, from a host device, a read command to retrieve data from a memory array, retrieving the data from the memory array based at least in part on the read command, generating, based at least in part on retrieving the data, a first code for detecting one or more errors in a first set of bits of the data and a second code for detecting one or more errors in a second set of bits of the data, and transmitting, to the host device, the first code and the second code, and the first set of bits interleaved with the second set of bits.

In some examples of the method 800 and the apparatus described herein, transmitting the first set of bits interleaved with the second set of bits may include operations, features, circuitry, logic, means, or instructions for transmitting, during a first unit interval, a first portion of the first set of bits over first data lines and a first portion of the second set of bits over second data lines and transmitting, during a second unit interval, a second portion of the first set of bits over the second data lines and a second portion of the second set of bits over the first data lines.

In some examples of the method 800 and the apparatus described herein, each data line of the first data lines may be physically separated from other data lines of the first data lines by at least one data line of the second data lines.

In some examples of the method 800 and the apparatus described herein, transmitting the first set of bits interleaved with the second set of bits may include operations, features, circuitry, logic, means, or instructions for transmitting the first set of bits over a first subset of pins of the memory device and the second set of bits over a second subset of pins of the memory device, each pin of first subset of pins being physically adjacent to at least one pin of the second subset of pins.

Some examples of the method 800 and the apparatus described herein may further include operations, features, circuitry, logic, means, or instructions for generating a third code for detecting one or more errors in third set of bits of the data, where transmitting the first set of bits interleaved with the second set of bits includes transmitting the first set of bits, the second set of bits, and the third set of bits.

In some examples of the method 800 and the apparatus described herein, transmitting the first set of bits, the second set of bits, and the third set of bits may include operations, features, circuitry, logic, means, or instructions for transmitting, during a first unit interval, a first portion of the first set of bits over first data lines, a first portion of the second set of bits over second data lines, and a first portion of the third set of bits over third data lines and transmitting, during a second unit interval, a second portion of the first set of bits over the third data lines, a second portion of the second set of bits over the first data lines; and a second portion of the third set of bits over the second data lines.

In some examples of the method 800 and the apparatus described herein, transmitting the first set of bits, the second set of bits, and the third set of bits may include operations, features, circuitry, logic, means, or instructions for transmitting, during a third unit interval, a third portion of the first set of bits over the second data lines, a third portion of the second set of bits over the third data lines, and a third portion of the third set of bits over the first data lines.

In some examples of the method 800 and the apparatus described herein, transmitting the first code and the second code may include operations, features, circuitry, logic, means, or instructions for transmitting, via a line associated with communicating error control information, the first code interleaved with the second code.

Some examples of the method 800 and the apparatus described herein may further include operations, features, circuitry, logic, means, or instructions for interleaving, the first set of bits and the second set of bits to generate interleaved data, where, starting with an initial bit of the interleaved data, set of bits of the interleaved data correspond to respective data line and unit interval pairs.

In some examples of the method 800 and the apparatus described herein, the first code or the second code includes an CRC code, an error correction code (ECC), an error detection code (EDC), or a combination hereof.

Figure 9:
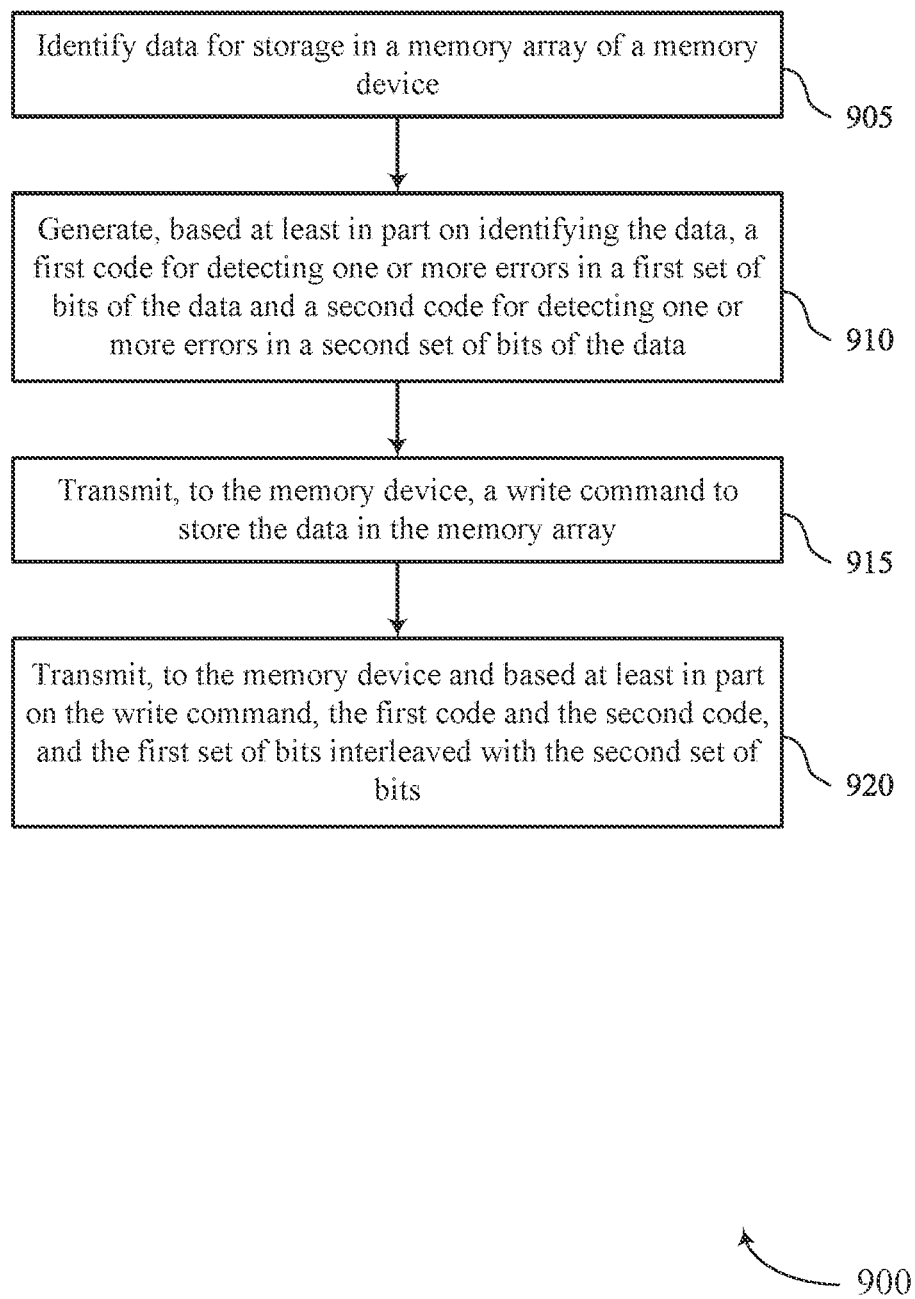

FIG. 9 shows a flowchart illustrating a method 900 that supports interleaved codeword transmission for a memory device in accordance with examples as disclosed herein. The operations of method 900 may be implemented by a host device or its components as described herein. For example, the operations of method 900 may be performed by a host device as described with reference to FIGS. 1 through 5 and 7. In some examples, a host device may execute a set of instructions to control the functional elements of the device to perform the described functions. Additionally, or alternatively, the host device may perform aspects of the described functions using special-purpose hardware.

At 905, the method may include identifying data for storage in a memory array of a memory device. The operations of 905 may be performed in accordance with examples as disclosed herein. In some examples, aspects of the operations of 905 may be performed by an application manager 725 as described with reference to FIG. 7.

At 910, the method may include generating, based at least in part on identifying the data, a first code for detecting one or more errors in a first set of bits of the data and a second code for detecting one or more errors in a second set of bits of the data. The operations of 910 may be performed in accordance with examples as disclosed herein. In some examples, aspects of the operations of 910 may be performed by a host error protection circuitry 730 as described with reference to FIG. 7.

At 915, the method may include transmitting, to the memory device, a write command to store the data in the memory array. The operations of 915 may be performed in accordance with examples as disclosed herein. In some examples, aspects of the operations of 915 may be performed by a host command interface 735 as described with reference to FIG. 7.

At 920, the method may include transmitting, to the memory device and based at least in part on the write command, the first code and the second code, and the first set of bits interleaved with the second set of bits. The operations of 920 may be performed in accordance with examples as disclosed herein. In some examples, aspects of the operations of 920 may be performed by a host data interface 740 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for identifying data for storage in a memory array of a memory device, generating, based at least in part on identifying the data, a first code for detecting one or more errors in a first set of bits of the data and a second code for detecting one or more errors in a second set of bits of the data, transmitting, to the memory device, a write command to store the data in the memory array, and transmitting, to the memory device and based at least in part on the write command, the first code and the second code, and the first set of bits interleaved with the second set of bits.

In some examples of the method 900 and the apparatus described herein, transmitting the first set of bits interleaved with the second set of bits may include operations, features, circuitry, logic, means, or instructions for transmitting, during a first unit interval, a first portion of the first set of bits over first data lines and a first portion of the second set of bits over second data lines and transmitting, during a second unit interval, a second portion of the first set of bits over the second data lines and a second portion of the second set of bits over the first data lines.

Some examples of the method 900 and the apparatus described herein may further include operations, features, circuitry, logic, means, or instructions for generating a third code for detecting one or more errors in third set of bits of the data, where transmitting the first set of bits interleaved with the second set of bits includes transmitting the first set of bits, the second set of bits, and the third set of bits.

In some examples of the method 900 and the apparatus described herein, transmitting the first code and the second code may include operations, features, circuitry, logic, means, or instructions for transmitting, via a line associated with communicating error protection information, the first code interleaved with the second code.

Figure 10:
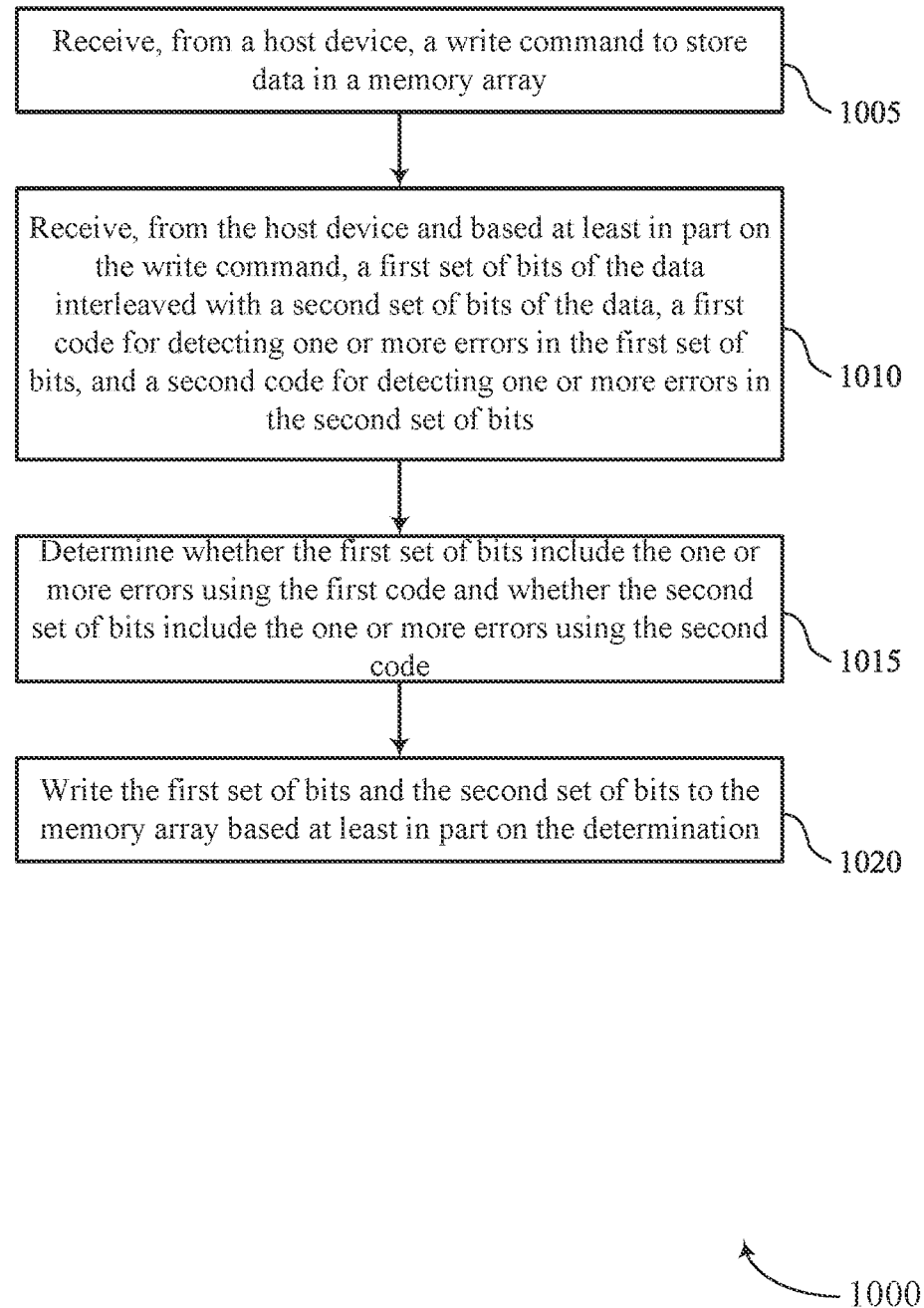

FIG. 10 shows a flowchart illustrating a method 1000 that supports interleaved codeword transmission for a memory device in accordance with examples as disclosed herein. The operations of method 1000 may be implemented by a memory device or its components as described herein. For example, the operations of method 1000 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 1005, the method may include receiving, from a host device, a write command to store data in a memory array. The operations of 1005 may be performed in accordance with examples as disclosed herein. In some examples, aspects of the operations of 1005 may be performed by a command interface 625 as described with reference to FIG. 6.

At 1010, the method may include receiving, from the host device and based at least in part on the write command, first set of bits of the data interleaved with second set of bits of the data, a first code for detecting one or more errors in the first set of bits, and a second code for detecting one or more errors in the second set of bits. The operations of 1010 may be performed in accordance with examples as disclosed herein. In some examples, aspects of the operations of 1010 may be performed by a data interface 640 as described with reference to FIG. 6.

At 1015, the method may include determining whether the first set of bits include the one or more errors using the first code and whether the second set of bits include the one or more errors using the second code. The operations of 1015 may be performed in accordance with examples as disclosed herein. In some examples, aspects of the operations of 1015 may be performed by an error protection circuitry 635 as described with reference to FIG. 6.

At 1020, the method may include writing the first set of bits and the second set of bits to the memory array based at least in part on the determination. The operations of 1020 may be performed in accordance with examples as disclosed herein. In some examples, aspects of the operations of 1020 may be performed by an array interface 630 as described with reference to FIG. 6.

In some examples, an apparatus as described herein may perform a method or methods, such as the method 1000. The apparatus may include, features, circuitry, logic, means, or instructions (e.g., a non-transitory computer-readable medium storing instructions executable by a processor) for receiving, from a host device, a write command to store data in a memory array, receiving, from the host device and based at least in part on the write command, first set of bits of the data interleaved with second set of bits of the data, a first code for detecting one or more errors in the first set of bits, and a second code for detecting one or more errors in the second set of bits, determining whether the first set of bits include the one or more errors using the first code and whether the second set of bits include the one or more errors using the second code, and writing the first set of bits and the second set of bits to the memory array based at least in part on the determination.

In some examples of the method 1000 and the apparatus described herein, receiving the first set of bits interleaved with the second set of bits may include operations, features, circuitry, logic, means, or instructions for receiving, during a first unit interval, a first portion of the first set of bits over first data lines and a first portion of the second set of bits over second data lines and receiving, during a second unit interval, a second portion of the first set of bits over the second data lines and a second portion of the second set of bits over the second data lines.

In some examples of the method 1000 and the apparatus described herein, receiving the first set of bits, the second set of bits, and the third set of bits may include operations, features, circuitry, logic, means, or instructions for receiving, during a first unit interval, a first portion of the first set of bits over first data lines, a first portion of the second set of bits over second data lines, and a first portion of the third set of bits over third data lines and receiving, during a second unit interval, a second portion of the first set of bits over the third data lines, a second portion of the second set of bits over the first data lines, and a third portion of the third set of bits over the second data lines.

In some examples of the method 1000 and the apparatus described herein, receiving the first code and the second code may include operations, features, circuitry, logic, means, or instructions for receiving the first code interleaved with the second code.

In some examples of the method 1000 and the apparatus described herein, determining whether the first set of bits include the one or more errors using the first code and whether the second set of bits include the one or more errors using the second code may include operations, features, circuitry, logic, means, or instructions for determining that the first set of bits include at least one error based at least in part on the first code.

In some examples of the method 1000 and the apparatus described herein, writing the first set of bits and the second set of bits to the memory array may include operations, features, circuitry, logic, means, or instructions for refraining from writing the first set of bits and the second set of bits to the memory array based at least in part on the first set of bits including the at least one error.

In some examples of the method 1000 and the apparatus described herein, determining whether the first set of bits include the one or more errors using the first code and whether the second set of bits include the one or more errors using the second code may include operations, features, circuitry, logic, means, or instructions for determining that the first set of bits and the second set of bits may be free from the one or more errors based at least in part on the first code and the second code.

Figure 11:
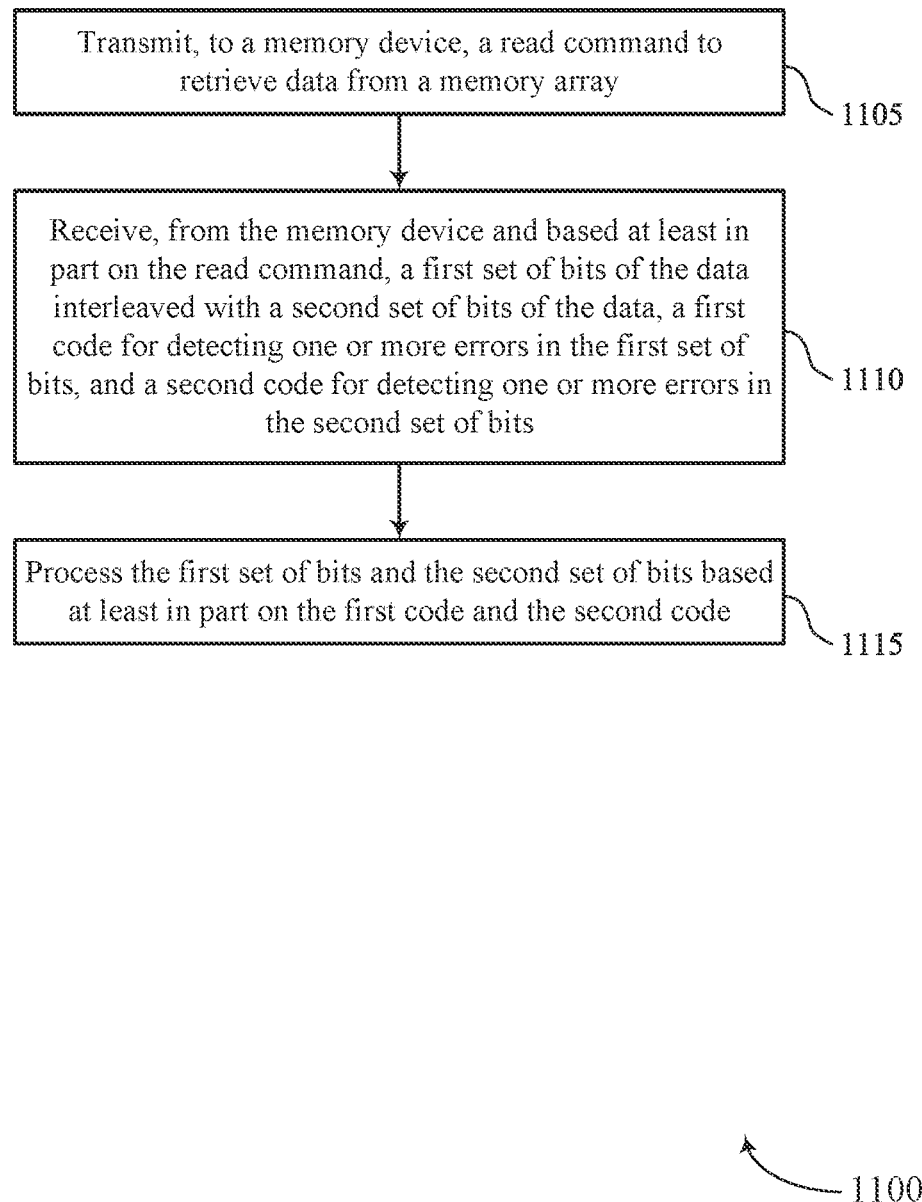

FIG. 11 shows a flowchart illustrating a method 1100 that supports interleaved codeword transmission for a memory device in accordance with examples as disclosed herein. The operations of method 1100 may be implemented by a host device or its components as described herein. For example, the operations of method 1100 may be performed by a host device as described with reference to FIGS. 1 through 5 and 7. In some examples, a host device may execute a set of instructions to control the functional elements of the device to perform the described functions. Additionally, or alternatively, the host device may perform aspects of the described functions using special-purpose hardware.

At 1105, the method may include transmitting, to a memory device, a read command to retrieve data from a memory array. The operations of 1105 may be performed in accordance with examples as disclosed herein. In some examples, aspects of the operations of 1105 may be performed by a host command interface 735 as described with reference to FIG. 7.

At 1110, the method may include receiving, from the memory device and based at least in part on the read command, first set of bits of the data interleaved with second set of bits of the data, a first code for detecting one or more errors in the first set of bits, and a second code for detecting one or more errors in the second set of bits. The operations of 1110 may be performed in accordance with examples as disclosed herein. In some examples, aspects of the operations of 1110 may be performed by a host data interface 740 as described with reference to FIG. 7.

At 1115, the method may include processing the first set of bits and the second set of bits based at least in part on the first code and the second code. The operations of 1115 may be performed in accordance with examples as disclosed herein. In some examples, aspects of the operations of 1115 may be performed by a host error protection circuitry 730 as described with reference to FIG. 7.

In some examples, an apparatus as described herein may perform a method or methods, such as the method 1100. The apparatus may include, features, circuitry, logic, means, or instructions (e.g., a non-transitory computer-readable medium storing instructions executable by a processor) for transmitting, to a memory device, a read command to retrieve data from a memory array, receiving, from the memory device and based at least in part on the read command, first set of bits of the data interleaved with second set of bits of the data, a first code for detecting one or more errors in the first set of bits, and a second code for detecting one or more errors in the second set of bits, and processing the first set of bits and the second set of bits based at least in part on the first code and the second code.

In some examples of the method 1100 and the apparatus described herein, receiving the first set of bits interleaved with the second set of bits may include operations, features, circuitry, logic, means, or instructions for receiving, during a first unit interval, a first portion of the first set of bits over first data lines and a first portion of the second set of bits over second data lines and receiving, during a second unit interval, a second portion of the first set of bits over the second data lines and a second portion of the second set of bits over the second data lines.

In some examples of the method 1100 and the apparatus described herein, receiving the first set of bits, the second set of bits, and the third set of bits may include operations, features, circuitry, logic, means, or instructions for receiving, during a first unit interval, a first portion of the first set of bits over first data lines, a first portion of the second set of bits over second data lines, and a first portion of the third set of bits over third data lines and receiving, during a second unit interval, a second portion of the first set of bits over the third data lines, a second portion of the second set of bits over the first data lines, and a third portion of the third set of bits over the second data lines.

In some examples of the method 1100 and the apparatus described herein, receiving the first code and the second code may include operations, features, circuitry, logic, means, or instructions for receiving the first code interleaved with the second code.

Some examples of the method 1100 and the apparatus described herein may further include operations, features, circuitry, logic, means, or instructions for determining whether the first set of bits include the one or more errors using the first code and whether the second set of bits include the one or more errors using the second code, where processing the first set of bits and the second set of bits may be based at least in part on the determination.

Some examples of the method 1100 and the apparatus described herein may further include operations, features, circuitry, logic, means, or instructions for determining that the first set of bits include at least one error based at least in part on the first code.

In some examples of the method 1100 and the apparatus described herein, processing the first set of bits and the second set of bits may include operations, features, circuitry, logic, means, or instructions for refraining from processing the first set of bits and the second set of bits based at least in part on the first set of bits including the at least one error.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array (e.g., memory array 315) configured to store information, a transceiver (e.g., transceiver 335) configured to communicate, via a plurality of conductive lines (e.g., the conductive lines of channel 340) coupled with a host device (e.g., host device 305), first set of bits of the data interleaved with second set of bits of the data, a first code for detecting one or more errors in the first set of bits of data, and a second code for detecting one or more errors in the second set of bits of data, and circuitry (e.g., error protection circuitry 320) coupled with the memory array and the transceiver, the circuitry configured to process the first code for detecting the one or more errors in the first set of bits of data and the second code for detecting the one or more errors in the second set of bits of the data.

In some examples, the apparatus may include second circuitry (e.g., interleaver 330) coupled with the circuitry and the transceiver, the second circuitry configured to interleave or deinterleave the first set of bits and the second set of bits.

In some examples of the apparatus, the circuitry includes second circuitry (e.g., first codeword circuitry 325-1) configured to process the first code for the first set of bits of the data and third circuitry (e.g., Lth codeword circuitry 325-L) configured to process the second code for the second set of bits of the data.

In some examples of the apparatus, the second circuitry may be coupled with a first subset of the plurality of conductive lines and the third circuitry may be coupled with a second subset of the plurality of conductive lines.

Another apparatus is described. The apparatus may include a processor (e.g., processor 380) configured to support an operation of an application; circuitry (e.g., host error protection circuitry 365) coupled with the processor and configured to process a first code for detecting one or more errors in a first set of bits of data associated with the application and a second code for detecting one or more errors in a second set of bits of the data; and a transceiver (e.g., host transceiver 360) coupled with the circuitry and configured to communicate, via a plurality of conductive lines (e.g., the conductive lines of channel 340) that is coupled with a memory device (e.g., memory device 310), the first set of bits of the data interleaved with the second set of bits of the data, the first code, and the second code In some examples, the apparatus may include second circuitry (e.g., host interleaver 370) coupled with the circuitry and the transceiver, the second circuitry configured to interleave or deinterleave the first set of bits and the second set of bits.

In some examples, the circuitry may include second circuitry (e.g., codeword circuitry 375-1) configured to process the first code for the first set of bits of the data; and third circuitry (e.g., Lth codeword circuitry 375-L) configured to process the second code for the second set of bits of the data In some examples of the apparatus, the second circuitry is coupled with a first subset of the plurality of conductive lines, and the third circuitry is coupled with a second subset of the plurality of conductive lines Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, from a host device, a read command to retrieve data from a memory array;
   retrieving the data from the memory array based at least in part on the read command;
   generating, based at least in part on retrieving the data, a first code for detecting one or more errors in a first set of bits of the data and a second code for detecting one or more errors in a second set of bits of the data; and transmitting, to the host device, the first code and the second code, and the first set of bits interleaved with the second set of bits.

2. The method of claim 1, wherein transmitting the first set of bits interleaved with the second set of bits comprises:
transmitting, during a first unit interval, a first portion of the first set of bits over first data lines and a first portion of the second set of bits over second data lines; and
transmitting, during a second unit interval, a second portion of the first set of bits over the second data lines and a second portion of the second set of bits over the first data lines.

3. The method of claim 2, wherein each data line of the first data lines are physically separated from other data lines of the first data lines by at least one data line of the second data lines.

4. The method of claim 1, wherein transmitting the first set of bits interleaved with the second set of bits comprises:
transmitting the first set of bits over a first subset of pins of a package and the second set of bits over a second subset of pins of the package, each pin of first subset of pins being physically adjacent to at least one pin of the second subset of pins.

5. The method of claim 1, further comprising:
generating a third code for detecting one or more errors in third set of bits of the data, wherein transmitting the first set of bits interleaved with the second set of bits comprises transmitting the first set of bits, the second set of bits, and the third set of bits.

6. The method of claim 5, wherein transmitting the first set of bits, the second set of bits, and the third set of bits comprises:
transmitting, during a first unit interval, a first portion of the first set of bits over first data lines, a first portion of the second set of bits over second data lines, and a first portion of the third set of bits over third data lines; and
transmitting, during a second unit interval, a second portion of the first set of bits over the third data lines, a second portion of the second set of bits over the first data lines; and a second portion of the third set of bits over the second data lines.

7. The method of claim 6, wherein transmitting the first set of bits, the second set of bits, and the third set of bits comprises:
transmitting, during a third unit interval, a third portion of the first set of bits over the second data lines, a third portion of the second set of bits over the third data lines, and a third portion of the third set of bits over the first data lines.

8. The method of claim 1, wherein transmitting the first code and the second code comprises:
transmitting, via a line associated with communicating error control information, the first code interleaved with the second code.

9. The method of claim 1, further comprising:
interleaving, the first set of bits and the second set of bits to generate interleaved data, wherein, starting with an initial bit of the interleaved data, set of bits of the interleaved data correspond to respective data line and unit interval pairs.

10. The method of claim 1, wherein the first code or the second code comprises a cyclic redundancy check (CRC) code, an error correction code (ECC), an error detection code (EDC), or a combination hereof.

11. A method, comprising:
identifying data for storage in a memory array of a memory device;
generating, based at least in part on identifying the data, a first code for detecting one or more errors in a first set of bits of the data and a second code for detecting one or more errors in a second set of bits of the data;
transmitting, to the memory device, a write command to store the data in the memory array; and
transmitting, to the memory device and based at least in part on the write command, the first code and the second code, and the first set of bits interleaved with the second set of bits.

12. The method of claim 11, wherein transmitting the first set of bits interleaved with the second set of bits comprises:
transmitting, during a first unit interval, a first portion of the first set of bits over first data lines and a first portion of the second set of bits over second data lines; and
transmitting, during a second unit interval, a second portion of the first set of bits over the second data lines and a second portion of the second set of bits over the first data lines.

13. The method of claim 11, further comprising:
generating a third code for detecting one or more errors in third set of bits of the data, wherein transmitting the first set of bits interleaved with the second set of bits comprises transmitting the first set of bits, the second set of bits, and the third set of bits.

14. The method of claim 11, wherein transmitting the first code and the second code comprises:
transmitting, via a line associated with communicating error protection information, the first code interleaved with the second code.

15. A method, comprising:
receiving, from a host device, a write command to store data in a memory array;
receiving, from the host device and based at least in part on the write command, a first set of bits of the data interleaved with a second set of bits of the data, a first code for detecting one or more errors in the first set of bits, and a second code for detecting one or more errors in the second set of bits;
determining whether the first set of bits include the one or more errors using the first code and whether the second set of bits include the one or more errors using the second code; and
writing the first set of bits and the second set of bits to the memory array based at least in part on the determining.

16. The method of claim 15, wherein receiving the first set of bits interleaved with the second set of bits comprises:
receiving, during a first unit interval, a first portion of the first set of bits over first data lines and a first portion of the second set of bits over second data lines; and
receiving, during a second unit interval, a second portion of the first set of bits over the second data lines and a second portion of the second set of bits over the second data lines.

17. The method of claim 15, wherein third set of bits are interleaved with the first set of bits and the second set of bits, and wherein receiving the first set of bits, the second set of bits, and the third set of bits comprises:
receiving, during a first unit interval, a first portion of the first set of bits over first data lines, a first portion of the second set of bits over second data lines, and a first portion of the third set of bits over third data lines; and
receiving, during a second unit interval, a second portion of the first set of bits over the third data lines, a second portion of the second set of bits over the first data lines, and a third portion of the third set of bits over the second data lines.

18. The method of claim 15, wherein receiving the first code and the second code comprises:
    receiving the first code interleaved with the second code.

19. The method of claim 15, wherein determining whether the first set of bits include the one or more errors using the first code and whether the second set of bits include the one or more errors using the second code comprises:
    determining that the first set of bits include at least one error based at least in part on the first code.

20. The method of claim 19, wherein writing the first set of bits and the second set of bits to the memory array comprises:
    refraining from writing the first set of bits and the second set of bits to the memory array based at least in part on the first set of bits including the at least one error.

21. The method of claim 15, wherein determining whether the first set of bits include the one or more errors using the first code and whether the second set of bits include the one or more errors using the second code comprises:
    determining that the first set of bits and the second set of bits are free from the one or more errors based at least in part on the first code and the second code.

22. A method, comprising:
    transmitting, to a memory device, a read command to retrieve data from a memory array;
    receiving, from the memory device and based at least in part on the read command, a first set of bits of the data interleaved with a second set of bits of the data, a first code for detecting one or more errors in the first set of bits, and a second code for detecting one or more errors in the second set of bits; and
    processing the first set of bits and the second set of bits based at least in part on the first code and the second code.

23. The method of claim 22, wherein receiving the first set of bits interleaved with the second set of bits comprises:
    receiving, during a first unit interval, a first portion of the first set of bits over first data lines and a first portion of the second set of bits over second data lines; and
    receiving, during a second unit interval, a second portion of the first set of bits over the second data lines and a second portion of the second set of bits over the second data lines.

24. The method of claim 22, wherein third set of bits are interleaved with the first set of bits and the second set of bits, and wherein receiving the first set of bits, the second set of bits, and the third set of bits comprises:
    receiving, during a first unit interval, a first portion of the first set of bits over first data lines, a first portion of the second set of bits over second data lines, and a first portion of the third set of bits over third data lines; and
    receiving, during a second unit interval, a second portion of the first set of bits over the third data lines, a second portion of the second set of bits over the first data lines, and a third portion of the third set of bits over the second data lines.

25. The method of claim 22, wherein receiving the first code and the second code comprises:
    receiving the first code interleaved with the second code.

26. The method of claim 22, further comprising:
    determining whether the first set of bits include the one or more errors using the first code and whether the second set of bits include the one or more errors using the second code, wherein processing the first set of bits and the second set of bits is based at least in part on the determining.

27. The method of claim 22, further comprising:
    determining that the first set of bits include at least one error based at least in part on the first code.

28. The method of claim 27, wherein processing the first set of bits and the second set of bits comprises:
    refraining from processing the first set of bits and the second set of bits based at least in part on the first set of bits including the at least one error.

29. A memory device, comprising:
    a memory array configured to store information;
    a transceiver configured to communicate, via a plurality of conductive lines coupled with a host device, a first set of bits of data stored in the memory array interleaved with a second set of bits of the data, a first code for detecting one or more errors in the first set of bits of the data, and a second code for detecting one or more errors in the second set of bits of the data; and
    circuitry coupled with the memory array and the transceiver, the circuitry configured to process the first code for detecting the one or more errors in the first set of bits of the data and the second code for detecting the one or more errors in the second set of bits of the data.

30. The memory device of claim 29, further comprising:
    second circuitry coupled with the circuitry and the transceiver, the second circuitry configured to interleave or deinterleave the first set of bits and the second set of bits.

31. The memory device of claim 29, wherein the circuitry comprises:
    second circuitry configured to process the first code for the first set of bits of the data; and
    third circuitry configured to process the second code for the second set of bits of the data.

32. The memory device of claim 31, wherein:
    the second circuitry is coupled with a first subset of the plurality of conductive lines, and
    the third circuitry is coupled with a second subset of the plurality of conductive lines.

* * * * *